(12) United States Patent
Hasegawa

(10) Patent No.: US 9,753,775 B2
(45) Date of Patent: Sep. 5, 2017

(54) RESOURCE MANAGEMENT APPARATUS AND RESOURCE MANAGEMENT METHOD

(71) Applicant: CANON KABUSHIKI KAISHA, Tokyo (JP)

(72) Inventor: Kiwamu Hasegawa, Kawasaki (JP)

(73) Assignee: Canon Kabushiki Kaisha, Tokyo (JP)

(\*) Notice: Subject to any disclaimer, the term of this patent is extended or adjusted under 35 U.S.C. 154(b) by 50 days.

(21) Appl. No.: 15/006,302

(22) Filed: Jan. 26, 2016

(65) Prior Publication Data

US 2016/0232033 A1    Aug. 11, 2016

(30) Foreign Application Priority Data

Feb. 6, 2015    (JP) .................. 2015-022346

(51) Int. Cl.
*G06F 9/46*     (2006.01)
*G06F 9/50*     (2006.01)
*G06F 9/445*    (2006.01)

(52) U.S. Cl.
CPC .............. *G06F 9/5005* (2013.01); *G06F 8/61* (2013.01); *G06F 8/62* (2013.01)

(58) Field of Classification Search
None
See application file for complete search history.

(56) References Cited

U.S. PATENT DOCUMENTS

2011/0202928 A1* 8/2011 Nakano ................ G06F 9/5011
                                                         718/104
2014/0137232 A1* 5/2014 Kobayashi ............ H04L 63/10
                                                          726/17

FOREIGN PATENT DOCUMENTS

JP         2009-020609 A    1/2009

\* cited by examiner

*Primary Examiner* — Sisley Kim
(74) *Attorney, Agent, or Firm* — Fitzpatrick, Cella, Harper & Scinto

(57) ABSTRACT

When an application 11*n* belonging to a group is installed or uninstalled, to allocate a resource region that the application 11*n* belonging to the group uses, a resource service 304, when an administrator requests installation of the application 11*n*, adds a resource upper-limit value of the group to the resource upper-limit value of the resource definition bundle original data, and installs the resource definition bundle 307.

12 Claims, 17 Drawing Sheets

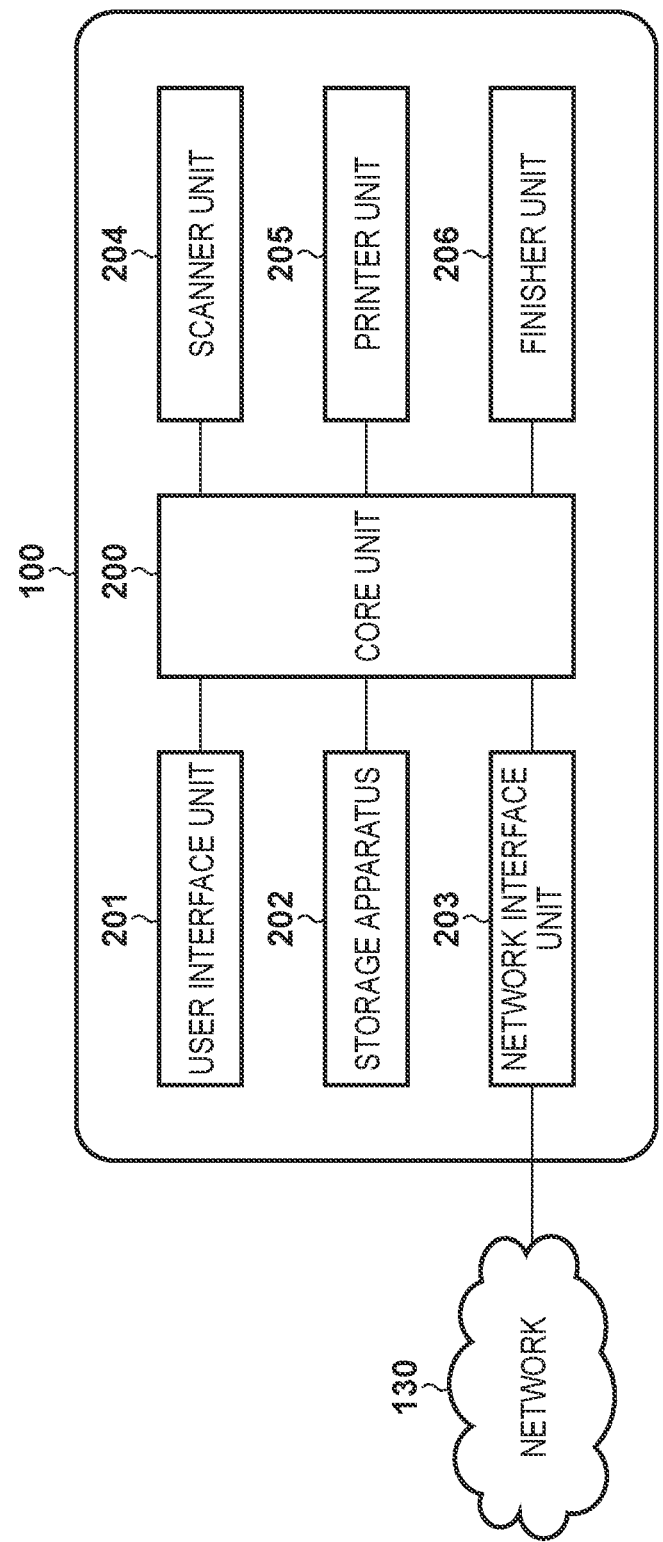

FIG. 5

| FRAGMENT BUNDLE ID 501 | GROUP ID 502 | DETECTION TIME 503 | DELETION DETECTION TIME 504 | MANAGEMENT TARGET APPLICATION ID 505 | ENABLED STATE 506 | RESOURCE UPPER-LIMIT VALUE 507 |
|---|---|---|---|---|---|---|
| FB01-22AC-3F95 | 9704-FC00-1032 | 2014/05/12 14:20 | (n/a) | A880-3021-0001-0100<br>A880-3021-0002-0100<br>A880-3021-0003-0104 | ENABLED | Storage : 228,000,000 bytes<br>Memory : 2,000,000 bytes<br>Thread : 3<br>Socket : 5<br>SSL_Socket : 2 |
| FB05-9C0A-8801 | 9704-F30E-020B | 2014/05/10 08:42 | (n/a) | A880-C10F-0002-0142<br>A880-C10F-0008-0133<br>A880-B902-003C-0401 | DISABLED | Storage : 185,300,000 bytes<br>Memory : 1,500,000 bytes<br>Thread : 2<br>Socket : 3<br>SSL_Socket : 2 |
| FB01-A020-9C4D | 9704-E200-C827 | 2014/04/29 09:52 | 2014/04/30 18:06 | A880-C10F-0002-0142<br>A880-C10F-000F-0133<br>A880-C10F-0088-0302 | UNINSTALLED | Storage : 317,000,000 bytes<br>Memory : 3,000,000 bytes<br>Thread : 4<br>Socket : 2<br>SSL_Socket : 1 |
| ⋯ | ⋯ | ⋯ | ⋯ | ⋯ | ⋯ | ⋯ |

500
510

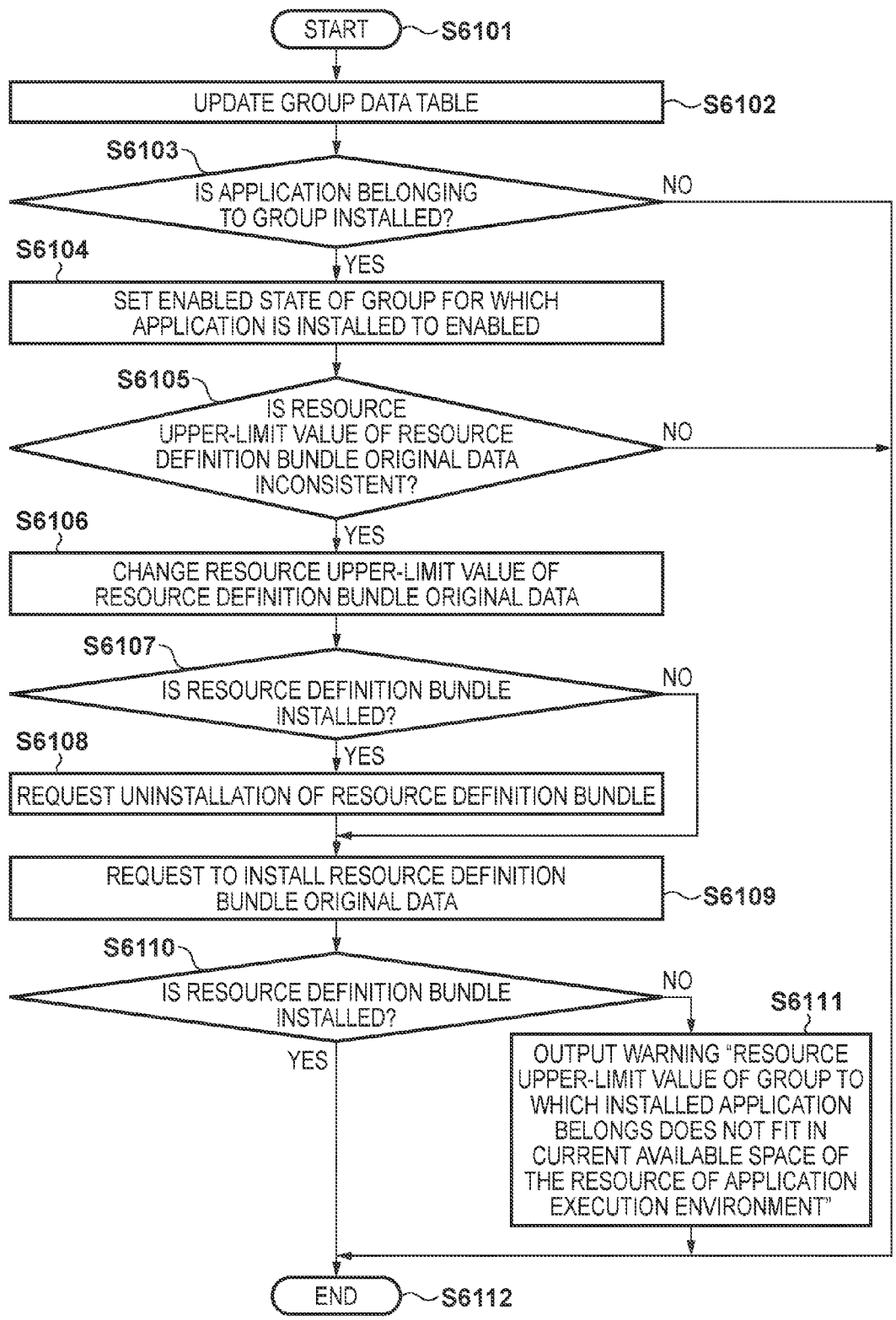

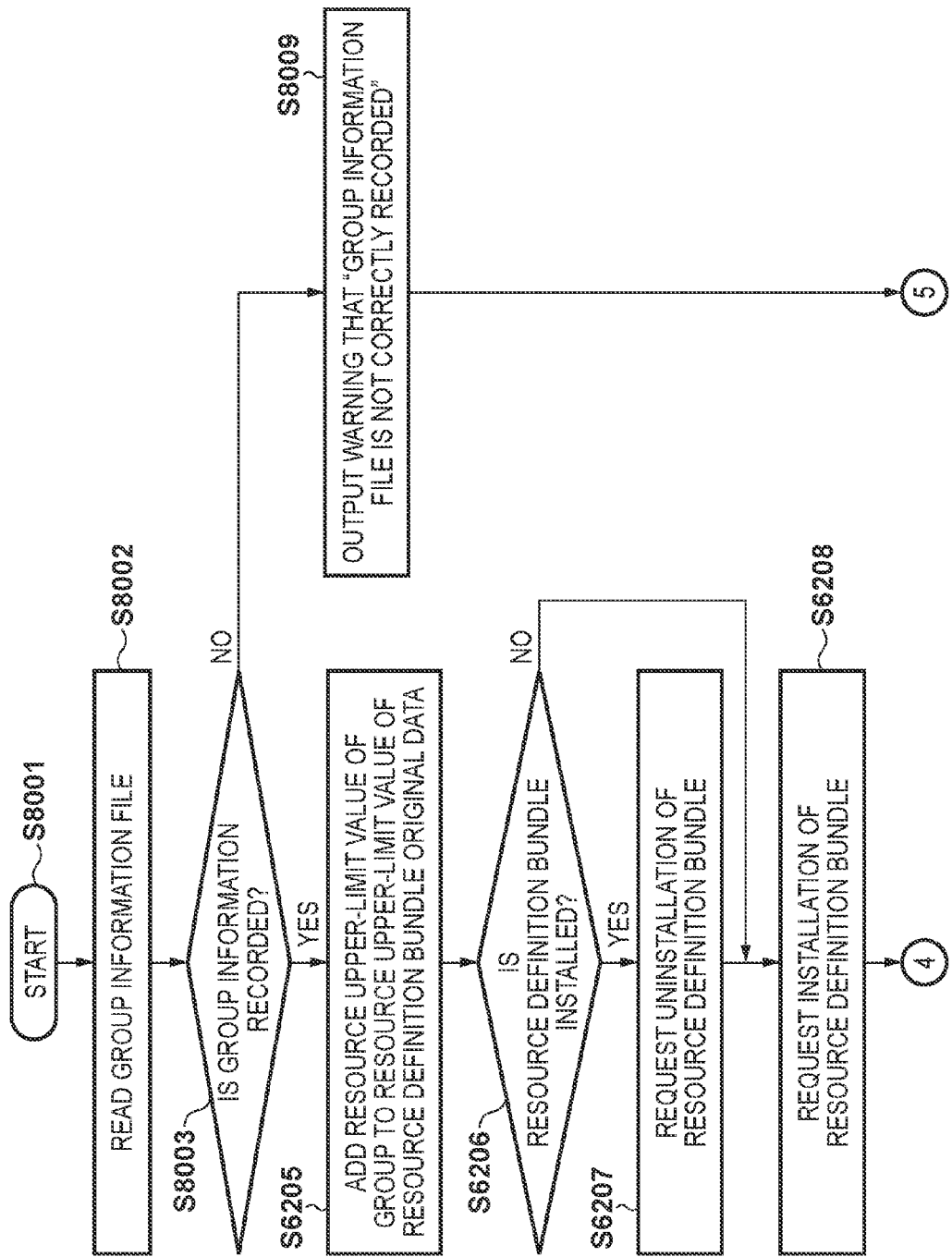

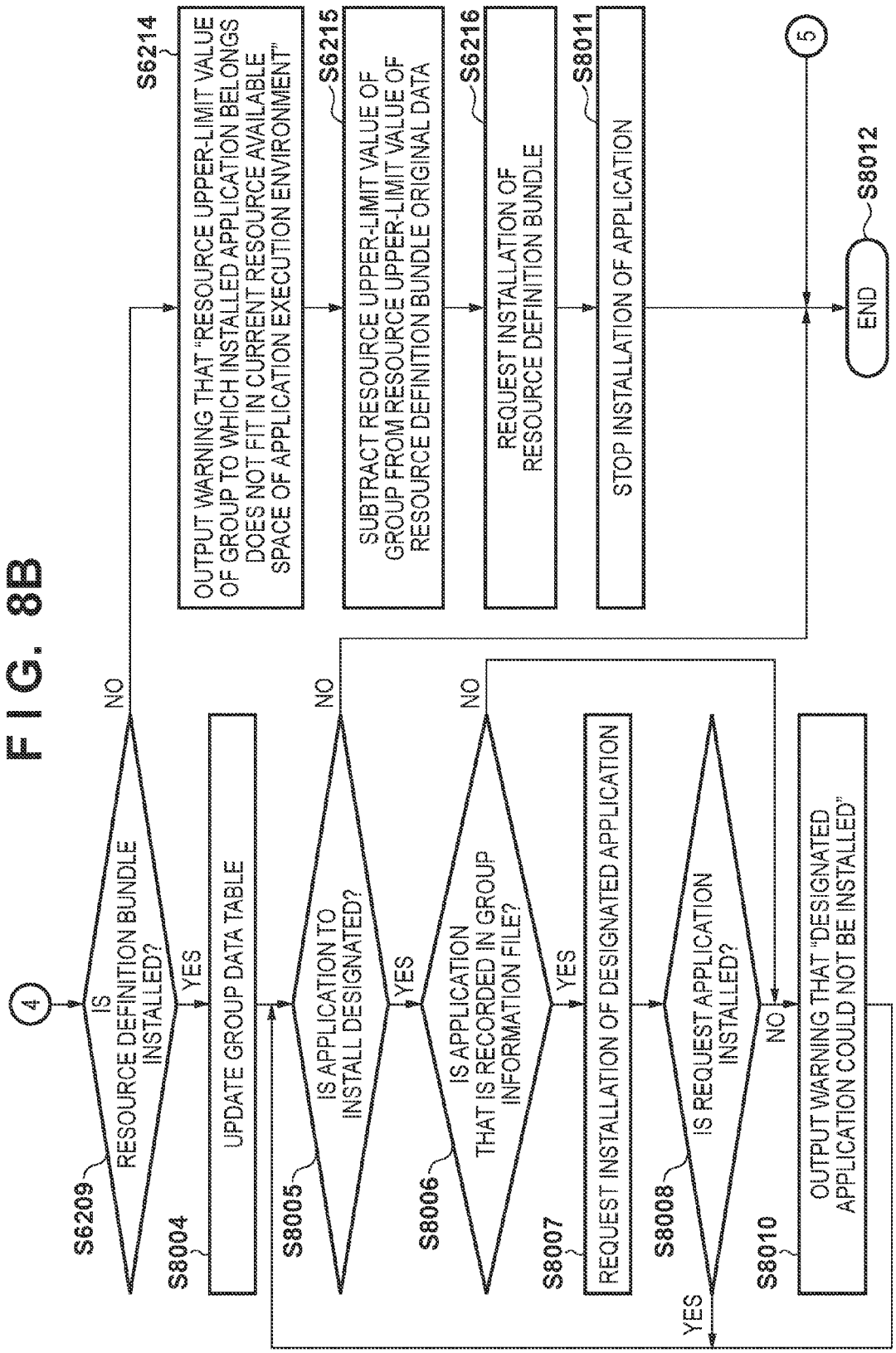

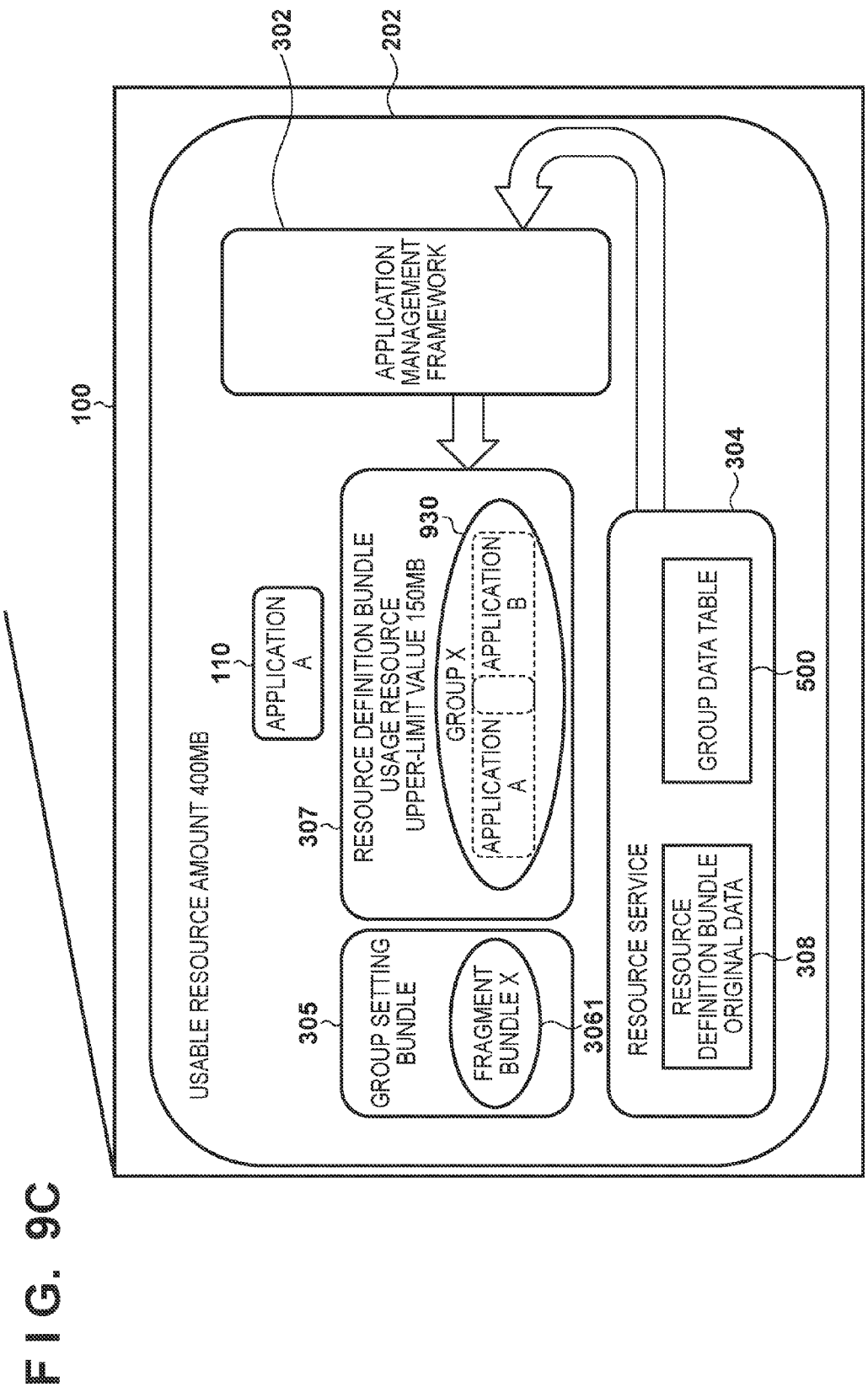

RESOURCE MANAGEMENT APPARATUS AND RESOURCE MANAGEMENT METHOD

BACKGROUND OF THE INVENTION

Field of the Invention

The present invention relates to a resource management apparatus, which dynamically manages a usage amount of resources that for example an embedded application or the like uses, and a resource management method.

Description of the Related Art

Conventionally, in an embedded-application execution environment, it is typical for there to be a restriction on a total amount of resources which are typical information device resources that an application uses. For this reason, the following is typically performed. In other words, an upper limit value is defined for an amount of a resource that each application uses. In addition, in an inspection stage at a time of an application installation, by an application management framework confirming that the usage amount of a resource by the application does not exceed the upper limit value, that the application stably operates is guaranteed.

As a conventional technique, there is a resource management system in which a resource amount used by an application in an information device is measured at a first activation time, and at second and subsequent activation times the measurement value is used to determine whether activation was performed (for example, refer to Japanese Patent Laid-Open No. 2009-20609). According to Japanese Patent Laid-Open No. 2009-20609, at the second or subsequent activation time of a particular application, if a sum total of the measurement value and a used resource amount of other applications activated in the information device does not exceed a resource amount usable in the information device then the application is activated, and if this does exceed the usable resource amount then activation of the application stands by. However, because management of an upper limit value (in other words the maximum value) of a usage resource of the application is not performed, a case in which the used resource amount of the application during operation exceeds the resource amount usable in the information device is possible. In such a case, it is not possible to guarantee that the application is caused to operate stably.

In management in accordance with an upper limit value of a usage resource, an application management framework allocates a resource corresponding to the upper limit value of the usage resource amount for each application. If a plurality of applications is operating, even in a case in which the resource use amounts thereof do not simultaneously reach the upper limit, a resource corresponding to a total value of the upper limit values is allocated. In such a case, there are times in which the actual resource usage amount is less than the total value of the upper limit values, thus a part of the resource amount allocated to applications is not used. Therefore, when a user wishes to install a new application, there are cases in which an application management framework cannot permit installation of the application irrespective of the fact that a resource amount that is necessary for the application actually can be allocated. In this way, it is difficult to appropriately manage a resource use amount of an application, and this is a cause of reduced resource use efficiency.

SUMMARY OF THE INVENTION

The present invention was made in view of the above-described conventional example, and provides a resource management apparatus and a resource management method that improves efficiency of usage of resources and more flexibly performs resource management when installing an application.

The present invention comprises the following configuration.

According to an aspect of the present invention, there is provided a resource management apparatus for managing a resource of an application in a unit of a group, the apparatus comprising at least one processor and at least one memory coupled to each other and cooperating to act as: a changing unit configured to, when an application belonging to a group is installed on a system that, due to an installation of an application, allocates for the application a resource in accordance with a declaration value of the application, add a declaration value of a resource of the group to which the installed application belongs to a declaration value of a resource of a resource definition application; and an install unit configured to install, after addition processing by the changing unit, the resource definition application in the system.

If the present invention is used, it is possible to flexibly change a resource upper-limit value of a resource service.

Further features of the present invention will become apparent from the following description of exemplary embodiments with reference to the attached drawings.

BRIEF DESCRIPTION OF THE DRAWINGS

FIG. 2 is a view for illustrating a hardware configuration of an image forming apparatus (100) according to the first and second embodiments of the present invention.

FIG. 5 is a view for illustrating content of a group data table according to the first and second embodiments of the present invention.

FIG. 6B is a flowchart that illustrates a processing flow of a resource service according to the first embodiment of the present invention.

FIGS. 6C-1 and 6C-2 show a flowchart that illustrates a processing flow of a resource service according to the first embodiment of the present invention.

FIGS. 8A and 8B show a flowchart that illustrates a processing flow of a resource service according to the second embodiment of the present invention.

FIG. 9C is a conceptual view of a time when a usage resource region of a group X is allocated.

DESCRIPTION OF THE EMBODIMENTS

Hereinafter, embodiments for working the present invention are explained using drawings. In the present embodiment, a resource service having a function of, when an application requests resource obtainment, determining whether the application exceeds an upper limit value of a usage resource, and allocating the resource if it does not exceed the usage resource is provided. In addition, instead of in units of applications, the resource service manages the resource in units of groups, with a plurality of applications as one group. The resource service has a grouping function that performs resource management in units of groups by an application developer registering in advance a plurality of applications as one group. For example, by a developer registering in advance applications for which resource use amounts do not simultaneously reach the upper limit between them as one group, the resource service manages so that the applications belonging to the group do not exceed the resource upper-limit value of the group. Here, for group-unit resource management to also conform to application-unit resource management by an application management framework, a resource that a group uses is included in a usage resource upper limit value of a resource service.

Here the resource upper-limit value of the resource service must be flexibly modified in accordance with a user environment. As factors for why the resource upper-limit value of the resource service must be changed, the following three items are given.

(1) A group that a user uses: the resource upper-limit value of a group changes in accordance with a combination of applications that a user uses.

(2) An application, incompatible with the resource service, that the user uses: an empty resource region in the information device changes in accordance with the usage condition of an application incompatible with the resource service.

(3) An information device used by a user: a usable resource region changes in accordance with an information device that the user uses.

Because factors such as the above exist, in accordance with a user environment, the resource upper-limit value of the resource service must be flexibly changed.

Embodiments explained below realize management in resource application group units such as described above, and relate to an apparatus implementing flexible and efficient resource management, a method, a program, or the like.

First Embodiment

<Configuration of Image Forming Apparatus>

Figure 1:
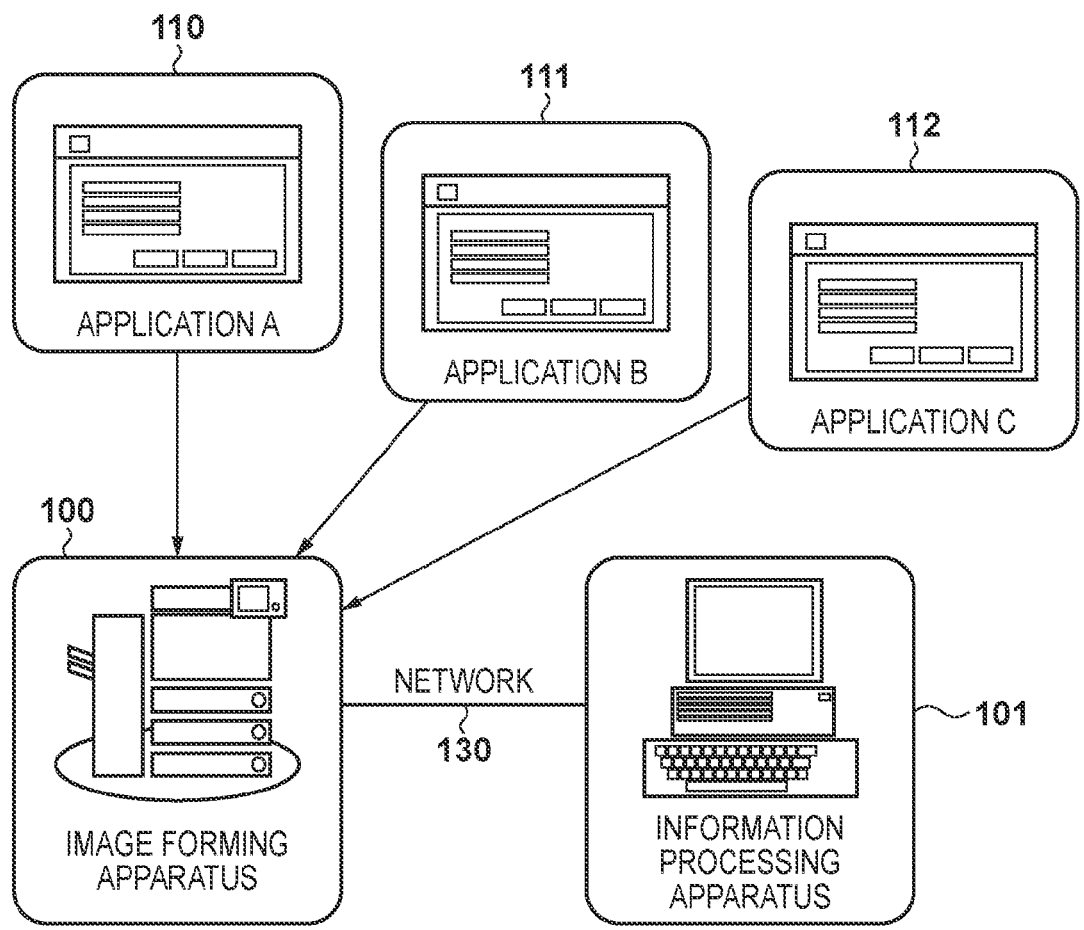
FIG. 1 is a view for illustrating an overall configuration of an apparatus according to first and second embodiments of the present invention.

FIG. 1 is a view for illustrating an overall configuration of an apparatus according to a first embodiment of the present invention. An image forming apparatus 100 is an image forming apparatus according to the present embodiment. A network 130 is a network that connects the image forming apparatus 100 and an information processing apparatus 101. The information processing apparatus 101 is used so as to use the image forming apparatus 100 via the network 130.

An application 110 is an application A, which is one example of an application that operates on the image forming apparatus 100. An application 111 is an application B, which is another example of an application that similarly operates on the image forming apparatus 100. Furthermore, an application 112 is an application C, which is yet one more example of an application that similarly operates on the image forming apparatus 100. It is possible to cause operation of one or a plurality of applications on the image forming apparatus 100. Here, three applications are exemplified. Hereinafter, an expression of "application 11$n$", indicates one or a plurality of applications represented by the application A 110, the application B 111, and the application C 112. A general user and an administrator can use a basic function of the image forming apparatus 100, the application 11$n$, and a resource management apparatus for managing the image forming apparatus 100 and the application 11$n$. In regards to usage, it is possible to directly operate the image forming apparatus 100, or operate it from the information processing apparatus 101 via the network 130.

Figure 6A:
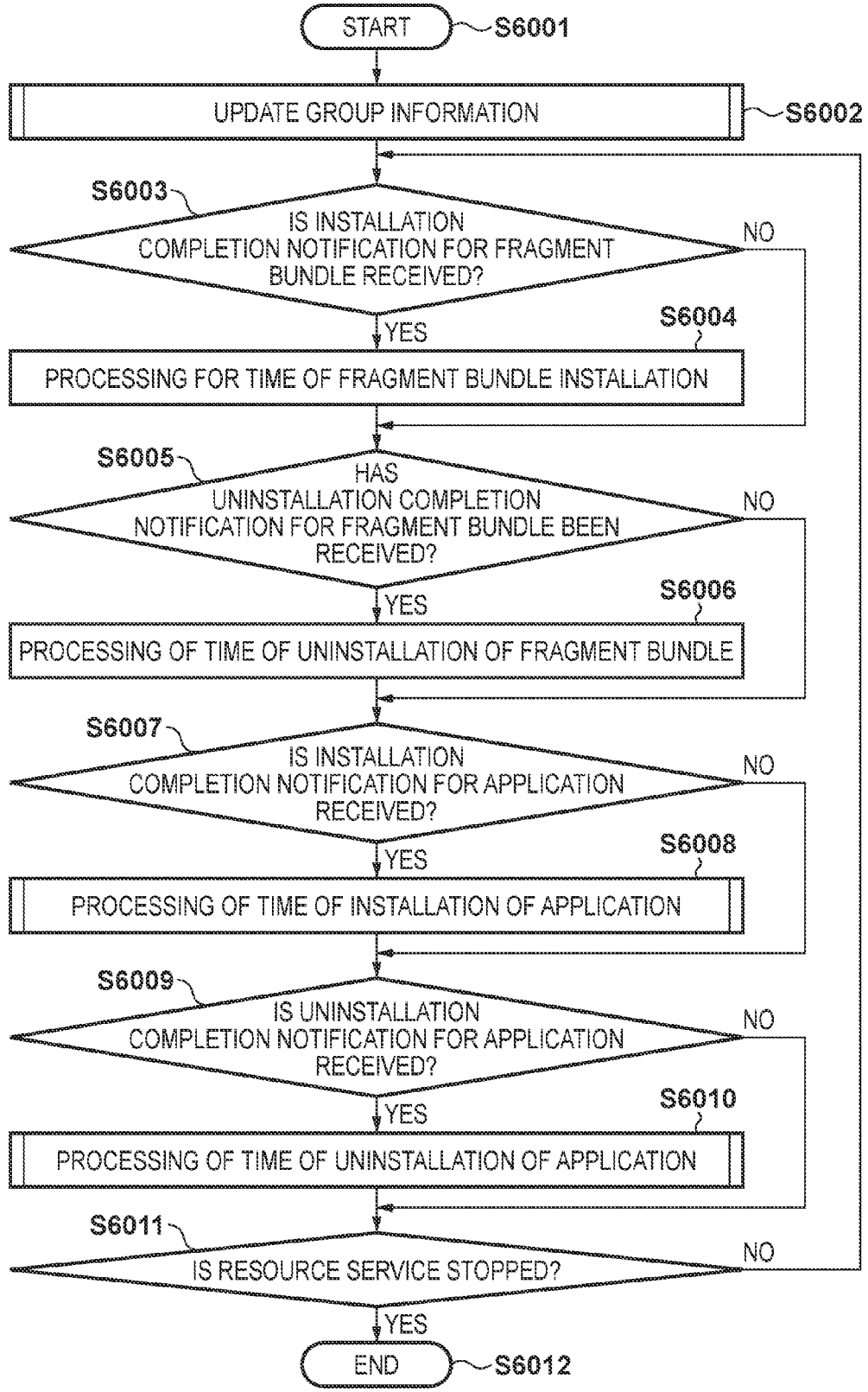
FIG. 6A is a flowchart that illustrates a processing flow of a resource service according to the first embodiment of the present invention.
Figures 1, 6C:
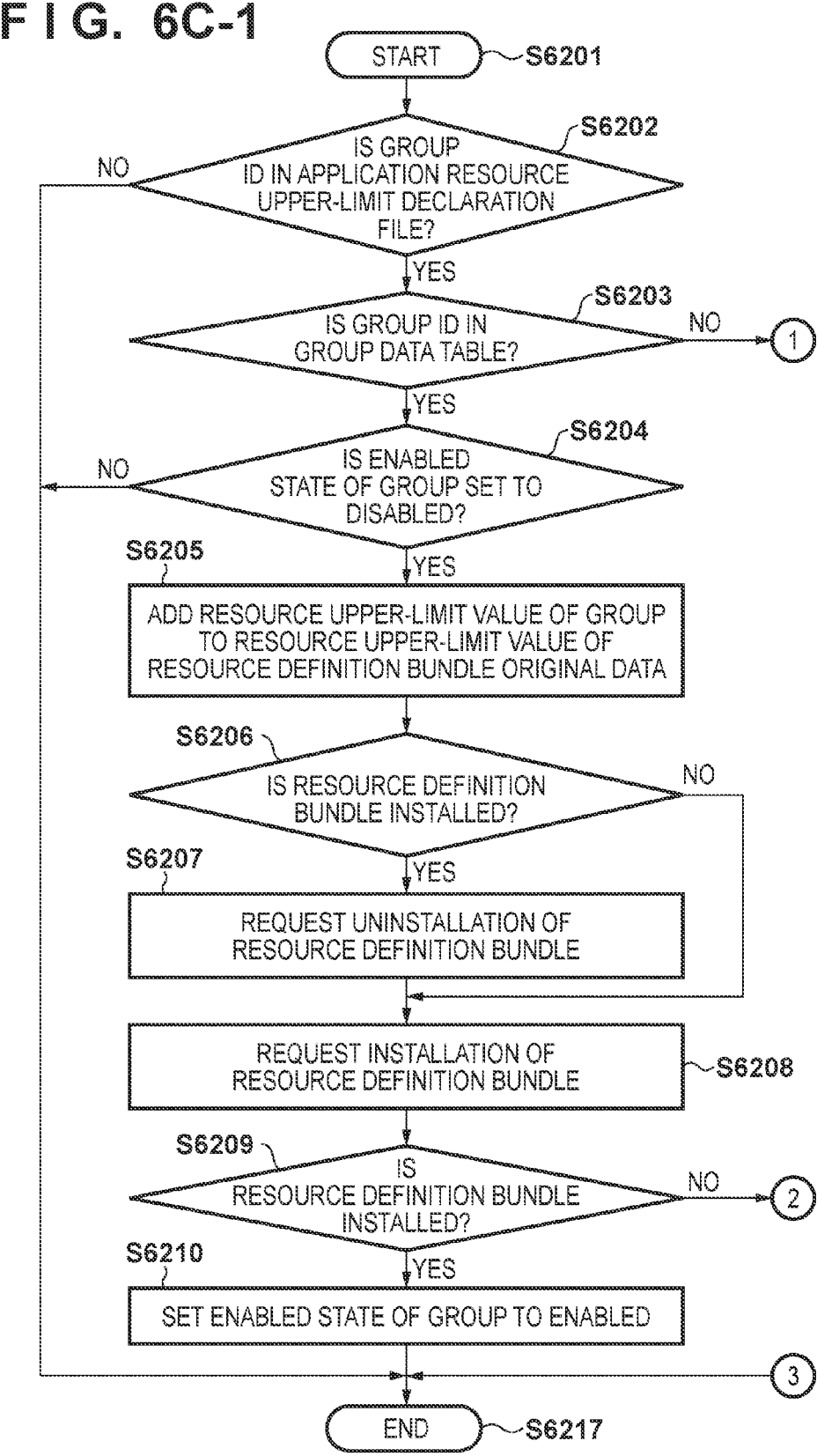
Figures 2, 6C:
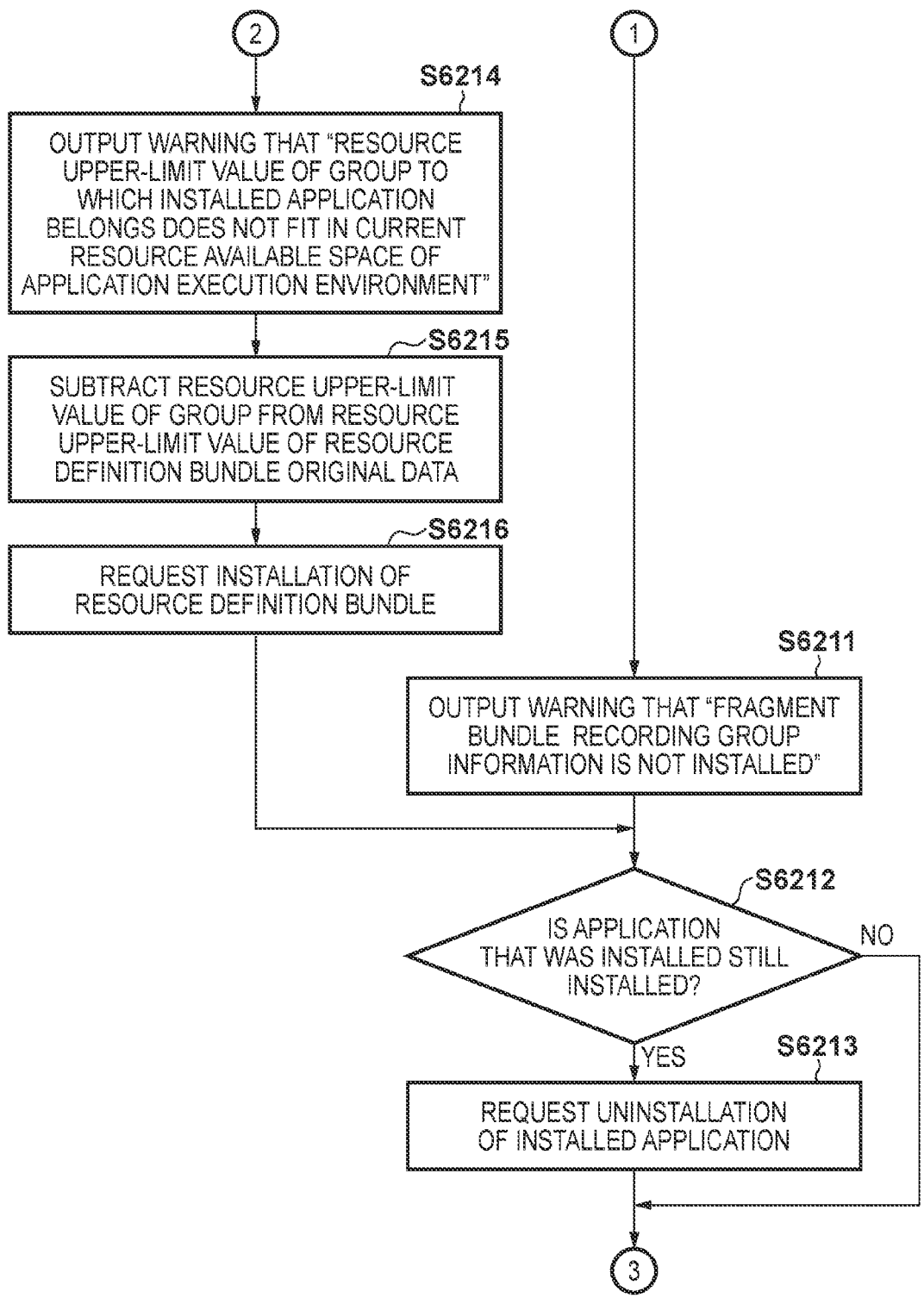

FIG. 2 schematizes a hardware configuration of the image forming apparatus 100. A core unit 200 has a processor, a memory, or the like, executes programs such as an operating system, an application, or the like, and realizes resource management according to the present embodiment. A user interface unit 201 has a touch panel, a display, a keyboard, or the like, outputs (displays) information to a user, and accepts input such as an operation from a user. A storage apparatus 202 is for example comprised by a hard disk or the like, and stores a program or data as a file. A network interface unit 203 is, for example, a network interface for connecting to the network 130, which is a LAN or the like. A scanner unit 204 reads an original image, for example optically, and outputs image data. A printer unit 205 forms an image corresponding to image data on a medium. A finisher unit 206 applies finishing processing such as sorting, stapling, hole punching, on a sheet medium on which image formation has been performed by the printer unit.

<Applications of Image Forming Apparatus and Execution Environment Thereof>

Figure 3:
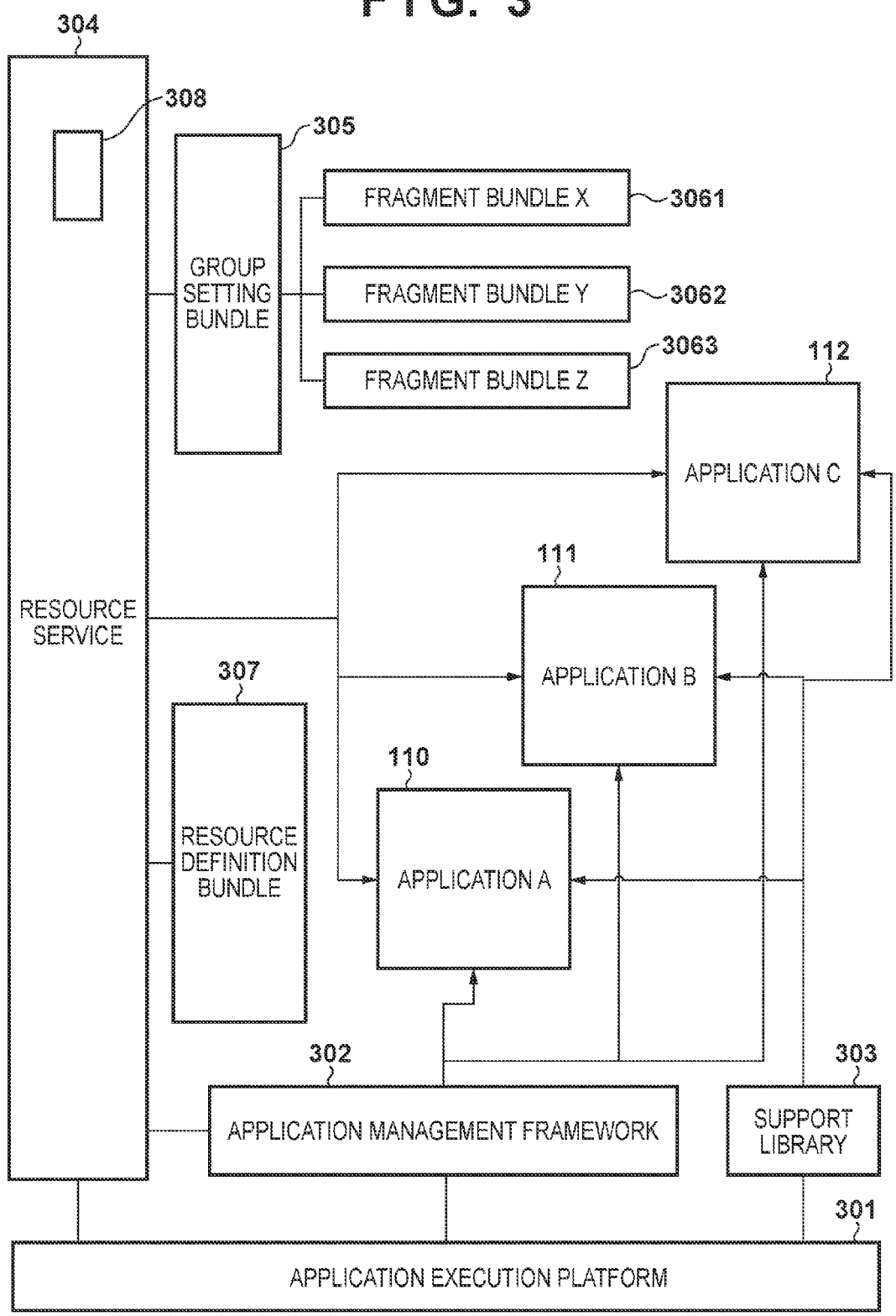
FIG. 3 is a view for illustrating a configuration of the application execution environment according to the first and second embodiments of the present invention.

FIG. 3 is an application execution environment for executing the application 11$n$ on the image forming apparatus 100 according to the present embodiment. An application execution platform 301 is a program for executing an application, and is for example a Java virtual machine (Java VM) or the like. An application management framework 302 is a framework that manages installation, uninstallation, execution, and termination of the application 11$n$, and is for example an OSGi (Open Services Gateway initiative) framework based on Java (registered trademark). To install and execute the application 11$n$ in the application execution environment, the application management framework 302 is used. As a typical basic operation of the application management framework 302, by an administrator making a request to install the application 11$n$, the application management framework 302 performs an install operation. At that time the application management framework 302 refers to an application resource upper-limit declaration file 402 (refer to FIG. 4A) of the install-target application, and determines whether a resource upper-limit value declared therein fits in a current available space of resources in the application execution environment. If it does not fit, then the installation is caused to fail. In other words, for example processing terminates without performing the installation of the application, and an administrator is notified to the effect that failure occurred. A support library 303 is a support library for the application 11$n$ to use various functions of the image forming apparatus 100. Hereinafter explanation is given of special configuration elements for implementing the present embodiment.

A resource service 304 is a program for managing a resource that the application 11n uses. A basic operation of the resource service 304 is a function for managing a resource that the application 11n uses, and a function for managing a plurality of applications as a group. The resource service 304 is an application, but is not included in the application 11n. The resource service 304 implements APIs that are provided to other applications, and an application that uses the resource service calls these APIs to obtain, release, or use a resource. A resource allocated by the resource service is returned to a request source as a resource object. For a resource that is a target of management by the resource service, for example this is a file as a storage resource, a socket as a communication resource, a thread as a computing resource, or the like. Of course a resource other than these is included as a management target. The resource object can be an abstraction of a resource such as described above, and for example includes information that indicates an allocated resource. Transferring (returning) a resource object to an application corresponds to allocating and transferring the requested resource to the application. Therefore, in the following explanation, returning a resource object is expressed as simply returning a resource.

Firstly, explanation will be given for a function that manages a resource that the application 11n uses. When obtaining and releasing a resource, a typical application respectively sends a resource obtainment request and a resource release request to the application execution platform. With respect to this, an application 11n that supports the resource service 304 respectively sends a resource obtainment request and a resource release request to the resource service 304 when obtaining a resource and when releasing it after use of it is finished. Having received the resource obtainment request, the resource service 304 refers to an upper limit value of a resource usage amount, which is set for the application 11n. Thereafter, if the resource upper limit is not reached, the resource is allocated and returned to the application 11n. In a case of exceeding the upper limit, an error is returned.

<Group Management Function Overview>

Next, explanation will be given of a function of managing a plurality of applications as a group. Before that, first explanation will be given for a bundle and a fragment bundle. In the OSGi framework, a bundle is a program portion (a so-called plugin) that is installed or uninstalled independently from the Java VM, which is an execution foundation for Java (registered trademark), and can be activated or stopped. In the OSGi framework, a fragment bundle is a bundle for which content thereof can be shared by other bundles (called host bundles), and, similarly to an application, a fragment bundle is provided as a Java (registered trademark) archive file that has a manifest header (a fragment bundle resource upper-limit declaration file of FIG. 4B). Because a fragment bundle is similar to an application, it may be referred to as a fragment application in the present embodiment.

Figure 4A:
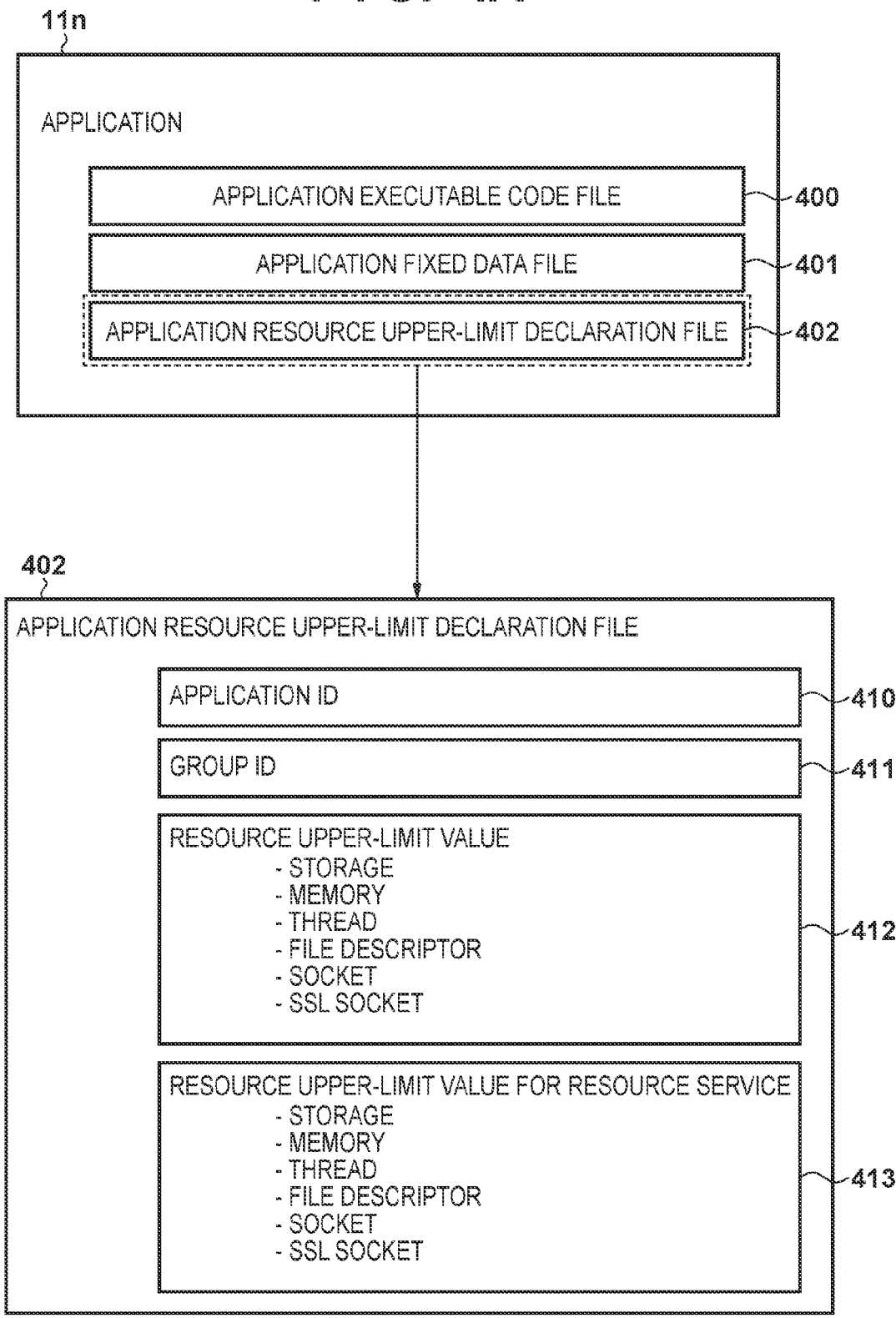
FIG. 4A is a view for illustrating content of a file that configures an application according to the first and second embodiments of the present invention.
Figure 4B:
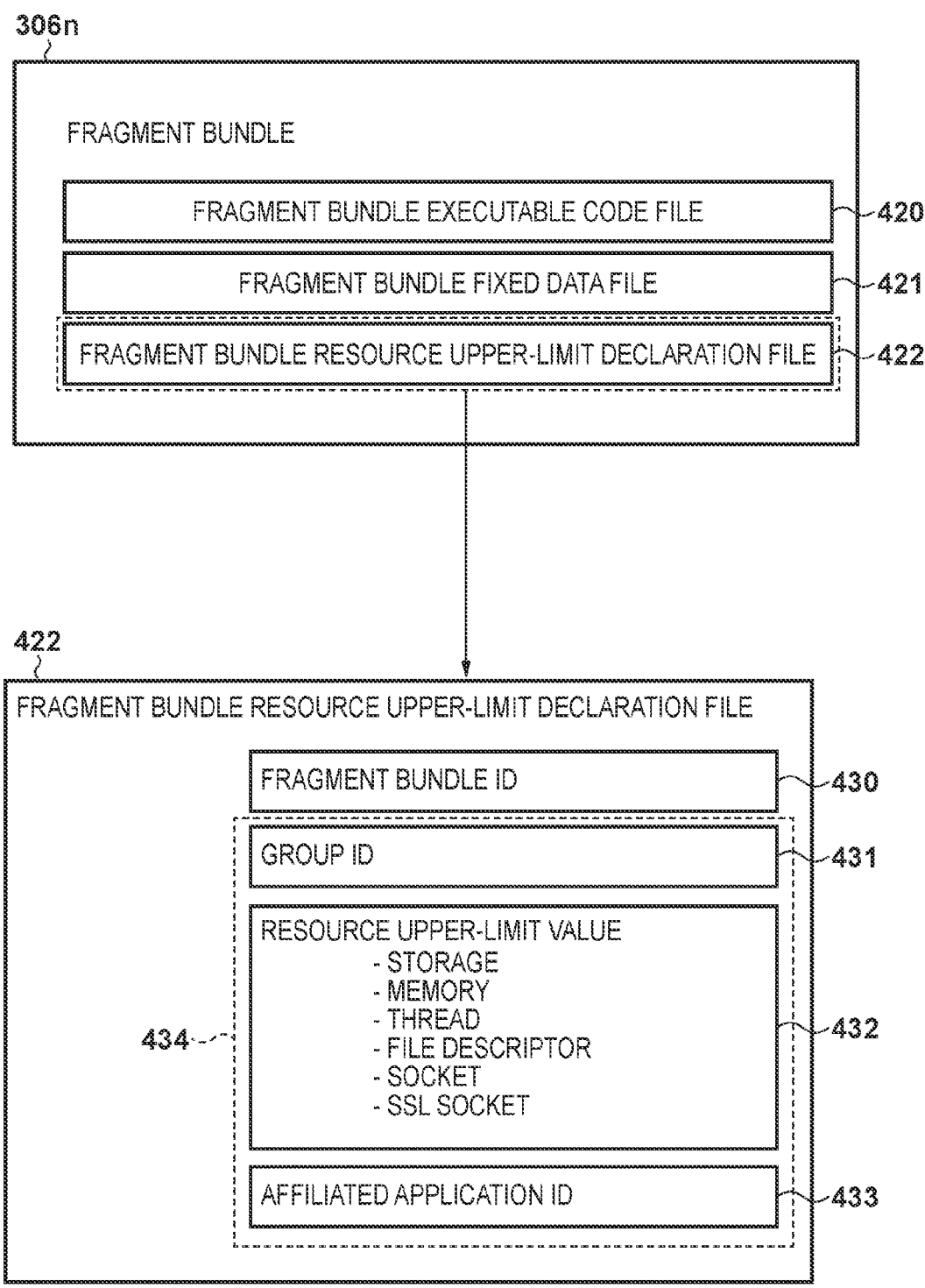
FIG. 4B is a view for illustrating content of a file that configures a fragment bundle according to the first and second embodiments of the present invention.

Next, explanation is given for a configuration of an application and a fragment bundle with reference to FIG. 4A and FIG. 4B. FIG. 4A is a view for explaining content of a representative file that configures the application 11n in the present embodiment. The application 11n has several types of files. An application executable code file 400 is a file that includes executable code or the like of an application. An application fixed data file 401 is a file that holds fixed data that an application has. The application resource upper-limit declaration file 402 is a file for declaring an upper limit value of a resource that the application uses.

Furthermore, as content thereof, the application resource upper-limit declaration file 402 includes the following description. An application ID 410 is a recitation of a value of an ID of the application 11n. A group ID 411 is a recitation of a group ID that designates a group to which the application 11n belongs. A resource upper-limit value 412 is a resource upper-limit value (or a declaration value) where there is a declaration of an upper limit value of a resource that the application 11n uses. Until the application 11n is uninstalled, even if this resource upper-limit value is changed, it is not reflected in a resource upper-limit value that the application management framework 302 manages internally. A resource upper-limit value 413 is a resource upper-limit value that the application 11n uses to perform a request for a resource with respect to the resource service 304. The resource upper-limit value 413, used by the resource service 304, is recorded when an application is managed by the resource service 304 in a state in which the application does not belong to a group.

FIG. 4B is a view for explaining content of a representative file that configures a fragment bundle 306n. A fragment bundle 306n also basically has a similar configuration to the application 11n given in FIG. 4A. A fragment bundle executable code file 420 is a file that includes executable code or the like. A fragment bundle fixed data file 421 is a file that holds fixed data. A fragment bundle resource upper-limit declaration file 422 is a file that records an upper limit of a resource that the fragment bundle uses.

A fragment bundle ID 430 indicates identification information of the fragment bundle. In addition a group ID 431 indicates a group ID of a group that the fragment bundle 306n declares. When the group of the group ID 431 described in the fragment bundle 306n is enabled, a resource upper-limit value 432 indicates a resource upper-limit value that declares a resource use amount allocated to the group. Application IDs 433 indicates application IDs of one or a plurality of the application 11n that belong to the group that the fragment bundle 306n declares. Group information 434 is group information recorded for the group ID 431.

Note that the concept illustrated by the term fragment bundle includes a software component corresponding to a fragment bundle of an OSGi framework, even if the application management framework 302 is not an OSGi framework.

Next, explanation is given of an overview of the group management function. The application management framework 302 manages applications one-by-one. In respect to this, the resource service 304, based on the group information 434 included in the declaration file that the fragment bundle 306n has, manages a plurality of applications as a group. When an application 11n belonging to the group is installed, or when a resource is obtained, the resource service 304 refers to the resource upper-limit value 432 of the group. When an application 11n belonging to the group is installed by the application management framework 302, the resource service 304 determines whether the resource upper-limit value of the group fits within the current available space of the resource in the application execution environment. If it does not fit, the resource service 304 causes the application belonging to the group to be uninstalled. In addition, when the application 11n belonging to the group obtains a resource, the resource service 304 refers to the upper limit value of the resource usage amount, which is set for the application 11n. Thereafter, if the resource upper limit is not reached, the resource is allocated and returned to the application 11n. In a case of exceeding the upper limit, an error is returned.

A group setting bundle 305 is a program that operates as a supplementary module with respect to the resource service 304. A host bundle is necessary to install or uninstall a fragment bundle, and in addition, at a time of installation or a time of uninstallation of the fragment bundle, the host bundle must be in a stopped state. Accordingly, to install or uninstall a fragment bundle 306n, which is to come later, the group setting bundle 305 operates as a supplementary module with respect to the resource service 304. In addition, the group setting bundle 305 also operates to obtain information of the fragment bundle 306n which is installed by the resource service 304.

Fragment bundles 3061-3063 are fragment bundles that operate with the group setting bundle 305 as a host bundle. A developer records the group information 434 in the fragment bundle 306n in advance. In the group information 434 is the group ID 431, the resource upper-limit value 432 of the group, and the application IDs 433 that belong to the group. If an administrator wishes to use a plurality of applications as one group, the administrator requests installation of the fragment bundle 306n of the group. In a case of using a plurality of groups, a user requests installation of those groups' worth of the fragment bundles 306n.

The resource service 304, the group setting bundle 305, and a resource definition bundle 307 are basically an applications, and have a similar configuration as the application 11n given on FIG. 4A. Accordingly, it is possible to also refer to a resource definition bundle as a resource definition application. The resource definition bundle 307 is a bundle that operates as a supplementary module with respect to the resource service 304. Resource definition bundle original data 308 that is necessary when installing the resource definition bundle 307 is caused by a developer of the resource service 304 to be held inside the resource service 304 in advance. The resource definition bundle original data 308, for example, includes a resource upper-limit value or the like of the resource definition bundle 307 at a certain time. An initial value thereof is, for example, an upper limit value of a resource that the resource definition bundle 307 itself consumes.

The resource definition bundle 307 is a bundle for allocating a resource region that the application 11n belonging to a group uses. Upon the application management framework 302 installing or uninstalling an application 11n belonging to a group, the resource service 304 refers to the group information 434 of the fragment bundle 306n for which the application ID of the application 11n has been recorded in the affiliated application IDs 433. The resource service 304 then adds (if increasing) or subtracts (if decreasing) the resource upper-limit value 432 of the group, to which the application 11n belongs, to or from the resource upper-limit value 412 of the resource definition bundle original data. Thereafter, based on the original data of the resource definition bundle for which the resource upper-limit value 412 has changed, the resource service 304 makes a request for installation of the resource definition bundle 307. By installing the resource definition bundle 307 for which the resource upper-limit value 412 has changed, a resource of the resource upper-limit value 412 of the resource definition bundle original data is allocated. In other words, it is possible allocate a resource region that the application 11n, which belongs to the group, uses.

A feature that distinguishes the resource service 304 is a point that it provides a common application programming interface (hereinafter, abbreviated as "API") that provides a service with respect to another unspecified application 11n. In addition, the resource service 304 performs, to the application management framework 302, a request to start or stop the group setting bundle 305, or a request to install or uninstall the resource definition bundle 307. The resource definition bundle original data 308 for installing the resource definition bundle 307 is held as internal data of the resource service 304. The resource service 304 requests the application management framework 302 to install the resource definition bundle original data 308 that is held. Upon installation being instructed, the application management framework 302 uses the resource definition bundle original data 308 to newly install the resource definition bundle 307.

Features that distinguish the group setting bundle 305 are a point that it manages fragment bundles that hold files in which a group setting is recorded, and a point that it is not started other than at a time of starting the resource service 304 and at a time of setting of a group. Because the group setting bundle 305 operates as a host bundle with respect to the fragment bundle 306n, the group setting bundle 305 must first be caused to stop before installing or uninstalling the fragment bundle 306n. Installation or uninstallation of the fragment bundle 306n itself is executed by the application management framework 302.

A feature that distinguishes the resource definition bundle 307 from the application 11n is a point that the resource upper-limit value declared in the fragment bundle 306n is added to the application resource upper-limit declaration file of the resource definition bundle 307.

If instructed to install the fragment bundle 306n, the application management framework 302 performs an install operation of the fragment bundle 306n. When the install operation completes, the application management framework 302 transmits an installation completion notification for the fragment bundle 306n to the resource service 304. Upon receiving the installation completion notification the resource service 304 requests the application management framework 302 to start the group setting bundle 305. When the group setting bundle 305 has been started, the resource service 304 requests the group setting bundle 305 for the group information 434 of the fragment bundle 306n. The group setting bundle 305 refers to the fragment bundle resource upper-limit declaration file 422 of the installed fragment bundle 306n. It then passes the group ID 431, the resource upper-limit value 432, and the affiliated applications ID 433 declared therein to the resource service. Upon obtaining this group information 434, the resource service 304 stores it in the storage apparatus 202, and requests the application management framework 302 to stop the group setting bundle 305.

<Group Data Table Example>

From a data table for holding data necessary for the resource service 304 of the present embodiment to execute group management of the application 11n, FIG. 5 schematically represents a group data table. A group data table 500 is a group data table that stores, in the storage apparatus 202, information of a fragment bundle that the resource service 304 obtained from the group setting bundle 305.

A reference numeral 501 is a column for holding the fragment bundle ID 430. A reference numeral 502 is a column for holding the group ID 431. A reference numeral 503 is a column for holding a time at which the resource service 304 first detected the fragment bundle 306n. When the resource service 304 first detected the fragment bundle 306n is a time at which the resource service 304 obtained the group information 434. A reference numeral 504 is a column for holding a time at which the resource service 304 detected that a fragment bundle 306n, which was installed and detected, was deleted and disappeared. Detection of the deletion is a at time at which the resource service 304 detects that the fragment bundle 306n, which has the group ID 431 that was stored in the storage apparatus 202, has been uninstalled. A reference numeral 505 is a column for holding the application ID 410 of applications that are targets that the fragment bundle 306n manages as a group. A reference numeral 506 is a column for holding an enabled state that records whether the fragment bundle is enabled. The column 506 for holding the enabled state can hold three states: "enabled", "disabled", and "uninstalled". After the fragment bundle 306n is installed, when the resource service 304 obtains the group information 434, the resource service 304 sets the enabled state 506 to "disabled". When any application 11n corresponding to the management target application ID 505 is installed, it is set to "enabled". When the applications 11n corresponding to the management target application ID 505 are all uninstalled, the resource service 304 sets the enabled state 506 to "uninstalled". Reference numeral 507 is a column for holding the resource upper-limit value 432 that the resource service 304 obtained from the group setting bundle 305. When the resource service 304 receives a request for a resource from an application 11n, the resource service 304 determines whether a resource amount that the application 11n is using does not exceed a resource upper-limit value. At this point, the resource service 304 refers to the resource upper-limit value 507 of the group data table 500. If the used resource amount exceeds the resource upper-limit value 507, the resource service 304 returns an error to the application 11n. A reference numeral 510 is an entry of the group data table 500 that relates to one fragment bundle 306n.

Next, explanation will be given of an example in which the resource service 304 refers to the group data table 500. If instructed to install the application 11n, the application management framework 302 performs an install operation for the application 11n. When the install operation completes, the application management framework 302 transmits an installation completion notification for the application 11n to the resource service 304. Upon receiving the installation completion notification, the resource service 304 refers to the group ID 411 and the application ID 410 recorded in the application resource upper-limit declaration file 402 of the installed application 11n. If the ID that is referred to is stored in the group data table 500 and the enabled state 506 is disabled, the resource service 304 changes the resource upper-limit value 412 of the resource definition bundle original data 308. Changing the resource upper-limit value 412 means adding to the resource upper-limit value 412 of the resource definition bundle original data 308 the resource upper-limit value 507 of the group ID 411 that the resource service 304 referred to. After changing the resource upper-limit value 412, if the resource definition bundle 307 is installed, the resource service 304 requests the application management framework 302 to uninstall the resource definition bundle 307. After a state in which the resource definition bundle 307 is not installed is entered, the resource service 304 requests the application management framework 302 to install the resource definition bundle 307, The application management framework 302 refers to the application resource upper-limit declaration file 402 of the resource definition bundle 307. It is then determined whether the resource upper-limit value 412 declared there will fit in the current available space of the resource of the application execution environment. If it will fit then installation completes. When the installation completes, the application management framework 302 transmits an installation completion notification for the resource definition bundle 307 to the resource service 304. Upon receiving this notification, the resource service 304 changes the enabled state 506 recited in the group data table 500, of the group ID 411 that is referred to, to enabled.

<Allocation of Resource Region by Installation of Resource Definition Bundle>

Figure 9A:
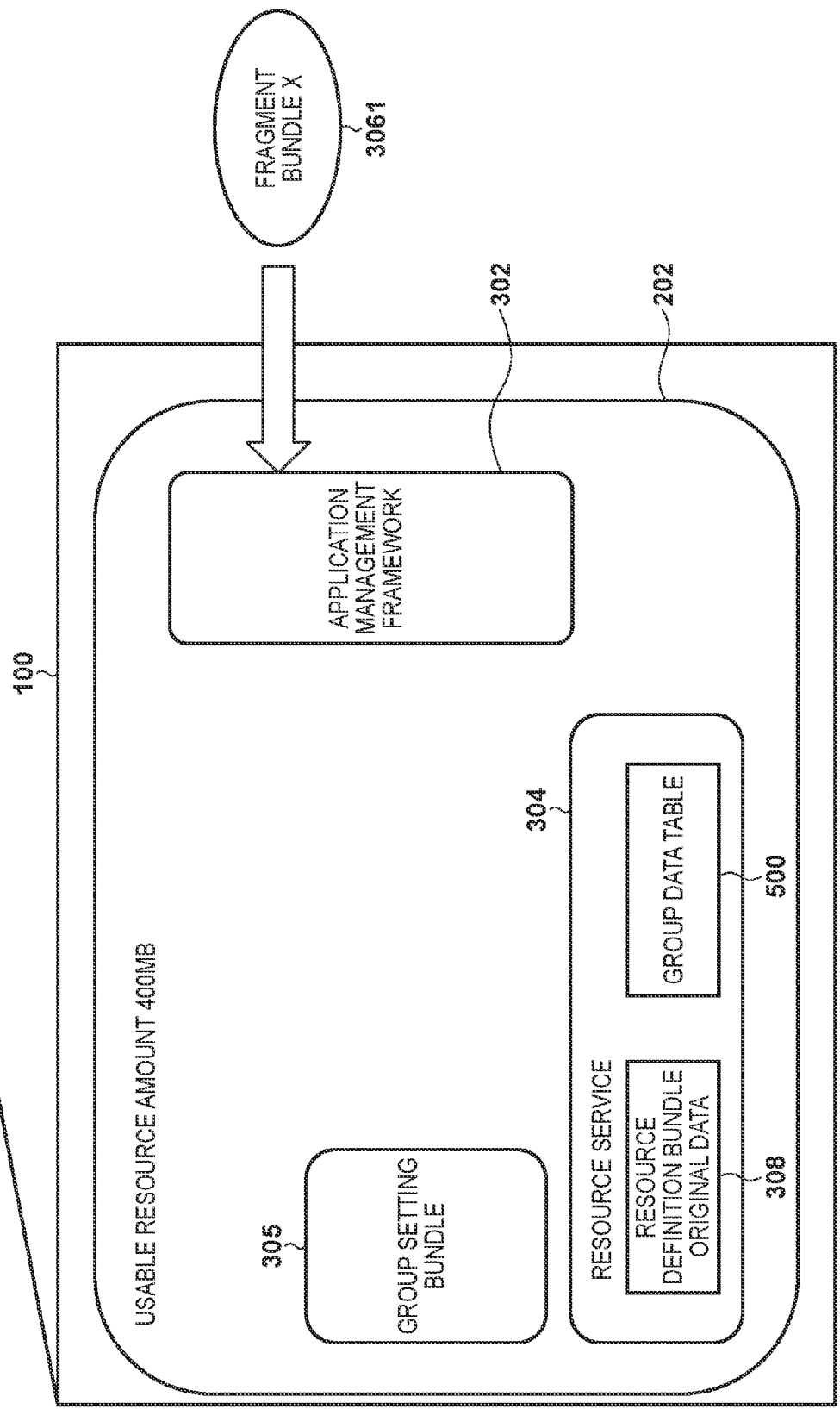
FIG. 9A is a conceptual view of a time when a used resource region of a group X is allocated.
Figure 9B:
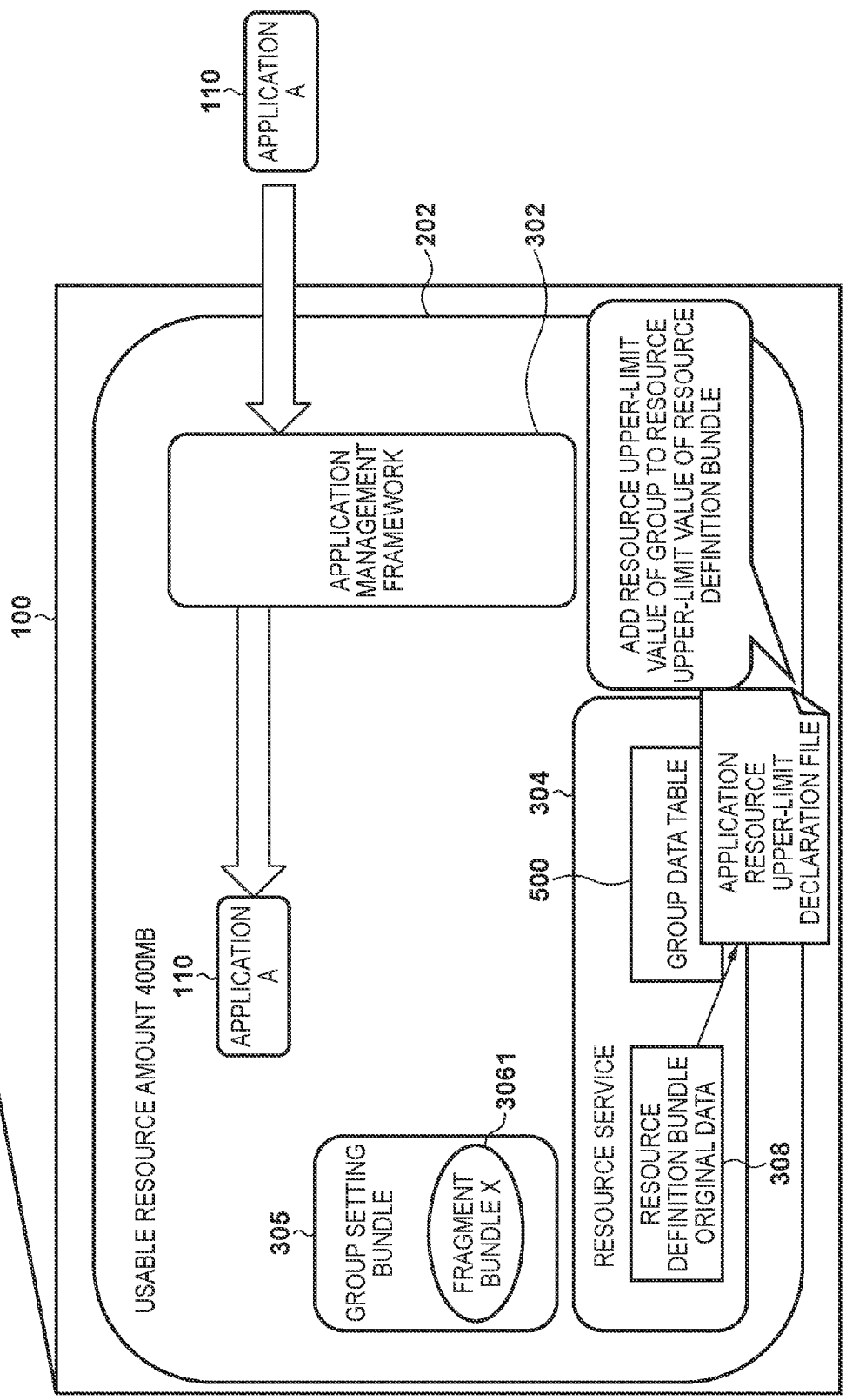
FIG. 9B is a conceptual view of a time when a used resource region of a group X is allocated.

FIG. 9A, FIG. 9B, and FIG. 9C are conceptual views of allocating, by installing the resource definition bundle 307, a resource region that the application A 110, which belongs to a group X, uses. FIG. 9A is a conceptual view of when an administrator requests installation of a fragment bundle X 3061. When an administrator installs a fragment bundle, the application management framework 302, the resource service 304, and the group setting bundle 305 are in a state of having been installed in the storage apparatus 202 of the image forming apparatus 100. In addition, the fragment bundle X 3061 has the fragment bundle resource upper-limit declaration file 422 in which the group information 434 of the group X is recorded. The resource service 304 has the group data table 500 and the resource definition bundle original data 308, which are necessary for installation of the resource definition bundle 307.

If an administrator wishes to register information of a group X in the resource service 304, firstly as illustrated in FIG. 9A, the administrator requests the application management framework 302 to install the fragment bundle X 3061. When the fragment bundle X 3061 is installed, the resource service 304 receives an installation completion notification of the fragment bundle. After reception of the installation completion notification, the resource service 304 obtains the group information 434 of the group X, which is recorded in the fragment bundle X 3061, and stores the group information 434 in the group data table 500. The group ID 431 is copied to a group ID 502, the resource upper-limit value 432 is copied to the resource upper-limit value 507, and the affiliated application IDs are copied to a management target application ID 504. At this time the enabled state 506 of the group data table 500 is disabled. By the resource service 304 storing the group information 434 to the group data table 500, registration of information of the group X to the resource service 304 completes.

FIG. 9B is a conceptual view of, after FIG. 9A, the administrator making an installation request for the application A 110 belonging to the group X, and after the application management framework 302 has installed the application A 110. Because the fragment bundle X 3061 is installed in FIG. 9A, the group setting bundle 305 holds the fragment bundle X 3061.

Upon the application management framework 302 installing the application A 110 that belongs to the group X, the resource service 304 receives an installation completion notification of the application. After reception of the installation completion notification, the resource service 304 refers to the resource upper-limit value 507 registered in the group data table 500, for the group X to which the installed application A 110 belongs. The resource service 304 adds the resource upper-limit value 507 of the group X, which is referred to, to the resource upper-limit value 412 of the application resource upper-limit declaration file 402 held by the resource definition bundle original data 308. Upon changing the resource upper-limit value 412 of the resource definition bundle original data 308, installation of the resource definition bundle 307 is performed, as illustrated in FIG. 9C.

FIG. 9C is a conceptual view of, after FIG. 9B, the resource service 304 making an installation request for the resource definition bundle 307, and is for when the application management framework 302 installs the resource definition bundle 307. The resource service 304 requests the application management framework 302 to install the resource definition bundle 307 based on the resource definition bundle original data 308. The application management framework 302 then installs the resource definition bundle 307. By the resource definition bundle 307 being installed, a resource region 930, which applications belonging to the group X use, is allocated. Note that in FIG. 9C the resource region of the application A 110 is allocated, but the resource region that is allocated for the application A is a minimum resource region necessary for an install process of an application. Thereafter, if an administrator installs the application B 111 that belongs to the group X, because a usage resource region of the group X is allocated, the application B 111 can also use the resource. In addition, when the application management framework 302 installs the resource definition bundle 307, if a necessary resource region cannot be allocated in the storage apparatus 202, the installation of the resource definition bundle 307 fails. In such a case, the resource service 304 requests the application management framework to uninstall the application A 110, and performs error processing.

By the above, as illustrated in the conceptual views of FIG. 9A, FIG. 9B, and FIG. 9C, it is possible to flexibly allocate a resource region that an application belonging to a group uses, with respect to a resource upper-limit value of the group.

<Resource Service Processing Flow>

FIG. 6A is a flowchart that schematically represents a flow of processing from start until stop of the resource service 304 according to the present embodiment. In parallel with the processing of the resource service, or when the resource service is stopped, it is possible for an administrator to instruct, for example, the application management framework 302, to install or uninstall an application or a fragment bundle of a group. When this installation or uninstallation is executed by the application management framework 302, a completion notification thereof is output to the resource service 304, and the resource service executes, by FIG. 6A, processing in accordance with the notification.

By this processing, as discussed above, by installing, in an addition, the fragment bundle 306n, which holds the group information 434, with respect to the group setting bundle 305, it is possible to add the group information 434 and cause it to be recognized. In addition, by installing an application that records the group information 434, it is possible enable an added group. Similarly by uninstalling all applications that record the group information 434, it is possible disable a group. By uninstalling the fragment bundle 306n, it is possible to remove the group information 434 from the control of the resource service. If the group becomes enabled or disabled, the processing explained here is executed when the resource service 304 is again started from a stopped state.

The processing starts from step S6001. A trigger of the processing is for example an administrator inputting a request for a resource service start from the user interface unit 201 or the like.

In step S6002 the resource service 304 first updates the group information 434. Whether it is necessary to update the resource upper-limit value of the resource definition bundle 307 from a previous resource service stop time is determined, and if necessary, the resource upper-limit value 412 of the resource definition bundle original data 308 is changed. FIG. 6B illustrates details of the processing of step S6002.

In step S6003 the resource service 304 determines whether it has received an installation completion notification for the fragment bundle 306n from the application management framework 302, and if received the processing proceeds to step S6004. If not received the processing proceeds to step S6005.

In step S6004 the resource service 304 performs processing of a time of a fragment bundle installation. In detail, the resource service 304 makes a request to the application management framework 302 to start the group setting bundle 305. When the group setting bundle 305 has been started, the resource service 304 requests the group setting bundle 305 for the group ID 431, the resource upper-limit value 432, and the affiliated applications 433 of the fragment bundle 306n. The group setting bundle 305 refers to the fragment bundle resource upper-limit file 422 of the installed fragment bundle 306n. Next, the group ID 431, the resource upper-limit value 432, and the affiliated applications 433 declared therein are passed to the resource service 304. Upon obtaining this information, the resource service 304 stores it in the storage apparatus 202. If a stored group ID 431 is not registered in the group data table 500, the group ID 431, the resource upper-limit value 432, and the affiliated applications 433 are registered in corresponding columns of the group data table 500, and the enabled state is set to "disabled". Then a request to the application management framework 302 to stop the group setting bundle 305 is made. When the group setting bundle 305 enters a stopped state again, the processing of the time of the fragment bundle installation is complete. In other words, the installation of the fragment bundle 306n functions as a means for transferring a declaration value of a resource of a group corresponding to the fragment bundle 306n to the resource service 304. When the processing at the time of the fragment bundle installation completes, the processing proceeds to step S6005.

In step S6005 the resource service 304 determines whether an uninstallation completion notification for the fragment bundle has been received, and if received the processing proceeds to step S6006. If not received the processing proceeds to step S6007. Note that if the application 11n recorded in the group information 434 of the fragment bundle 306n has been installed, an administrator cannot uninstall the fragment bundle 306n. In such a case, there is no reception of the uninstallation completion notification.

In step S6006, processing of a time of uninstallation of a fragment bundle is performed. From the group data table 500, the resource service 304 removes the group information 434 of the uninstalled fragment bundle 306n. Alternatively, the enabled state is set to uninstalled. Upon removing the group information 434, processing of a time of uninstallation of the fragment bundle is complete. When the processing at the time of the fragment bundle uninstallation completes, the processing proceeds to step S6007.

In step S6007 the resource service 304 determines whether an installation completion notification for the application 11n has been received, and if received the processing proceeds to step S6008. If not received the processing proceeds to step S6009. In step S6008 the resource service 304 performs processing of a time of application installation. FIGS. 6C-1 and 6C-2 illustrates details of the processing of step S6008. When processing at a time of installation is complete, the processing proceeds to step S6009.

Figure 6D:
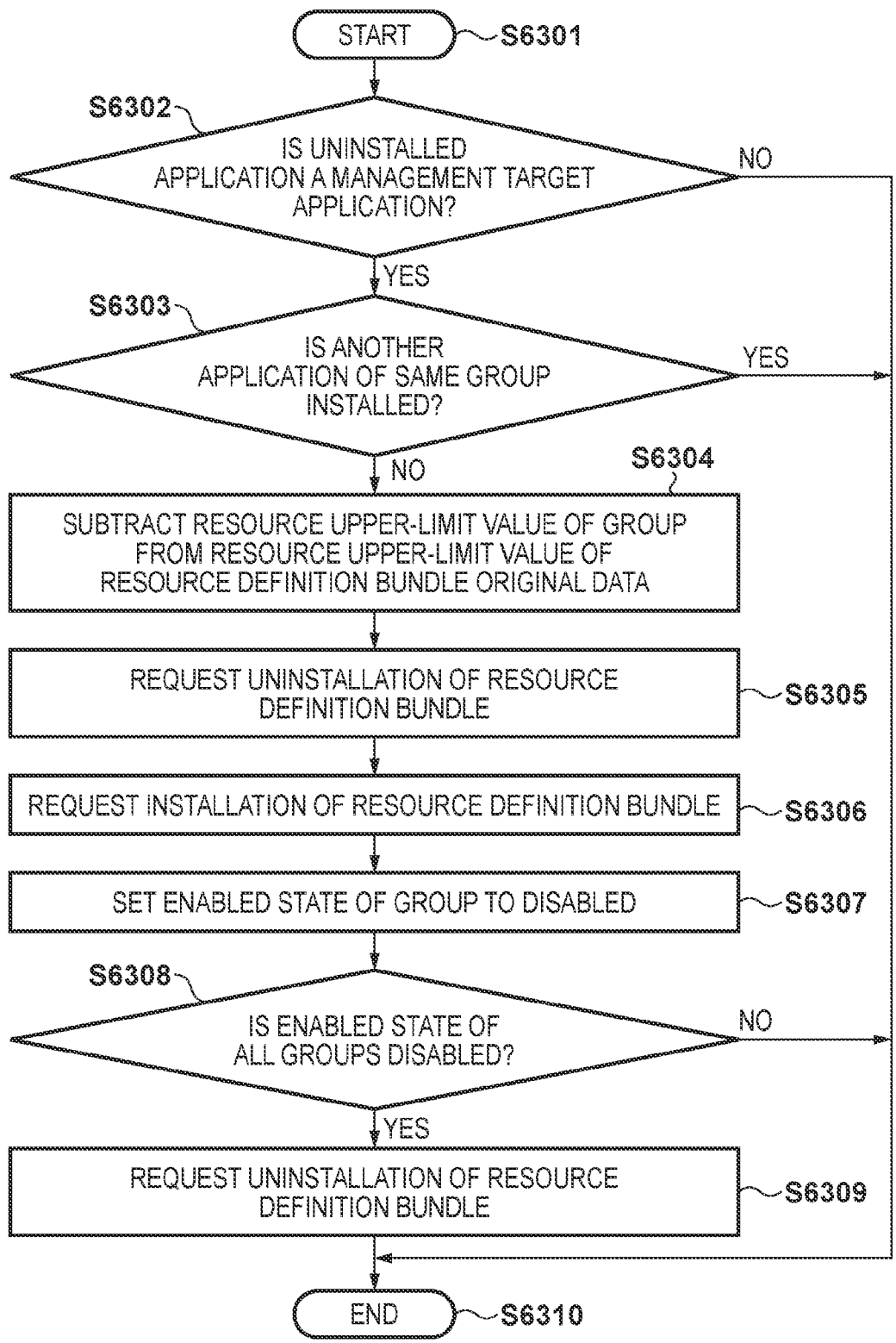
FIG. 6D is a flowchart that illustrates a processing flow of a resource service according to the first embodiment of the present invention.

In step S6009 the resource service 304 determines whether an uninstallation completion notification for the application 11n has been received, and if received the processing proceeds to step S6010. If not received the processing proceeds to step S6011. In step S6010 the resource service 304 performs processing of a time of application uninstallation. FIG. 6D illustrates details of the processing of step S6010. When processing at a time of uninstallation is complete, the processing proceeds to step S6011.

In step S6011, whether the resource service 304 has been stopped by the application management framework 302 is determined, and if stopped the processing proceeds to step S6012. If not stopped, the processing proceeds to step S6003. Upon reaching step S6012, the processing from the start to the stop of the resource service 304 completes.

<Resource Service Processing Summary>

From the above, when an administrator requests the start of the resource service, the application management framework 302 starts the resource service 304, and the resource service 304 executes processing of the flowchart of FIG. 6A. When the administrator requests installation of the fragment bundle 306n, the application management framework 302 installs the fragment bundle 306n. When the installation completes, the application management framework 302 issues an installation completion notification to the resource service 304. In step S6003, when it is determined that the resource service 304 has received an installation completion notification, the processing proceeds to step S6004.

When the administrator makes a request for uninstallation of the fragment bundle 306n, the application management framework 302 uninstalls the fragment bundle 306n. When the uninstallation completes, the application management framework 302 issues an uninstallation completion notification to the resource service 304. In step S6005, when it is determined that the resource service 304 has received an uninstallation completion notification, the processing proceeds to step S6006. When an administrator makes a request for installation of an application 11n, the application management framework 302 installs the application 11n. When the installation completes, the application management framework 302 issues an installation completion notification to the resource service 304. In step S6007, when it is determined that the resource service 304 has received an installation completion notification, the processing proceeds to step S6008. When an administrator makes a request for uninstallation of an application 11n, the application management framework 302 uninstalls the application 11n. When the uninstallation completes, the application management framework 302 issues an installation completion notification to the resource service 304. In step S6009, when it is determined that the resource service 304 has received an uninstallation completion notification, the processing proceeds to step S6011. When the administrator requests stoppage of the resource service, in step S6011 the application management framework stops the resource service, and the processing of the flowchart of FIG. 6A completes. If not stopped, the processing of the resource service from step S6003 is repeated.

FIG. 6B is a flowchart that schematically expresses a flow of processing in which the resource service 304 updates the group information 434 in step S6002. The processing starts from step S6101.

In step S6102, the resource service 304 updates the group information 434 of the group data table 500. As described with reference to FIG. 9A, FIG. 9B, and FIG. 9C, by installing the fragment bundle 306n, the group information 434 of the installed fragment bundle 306n is stored in the group data table 500. Here that processing is performed. For this, the resource service 304 requests the application management framework 302 to start the group setting bundle 305. The application management framework 302 starts the group setting bundle 305. When the group setting bundle 305 has been started, the resource service 304 obtains the group information 434 from the group setting bundle 305. The resource service 304 updates the content of the group data table 500 based on the obtained group information 434. Updating is performed, for example, by copying each item of obtained group information 343 to corresponding items of the group data table 500. With this, even with a newly installed fragment bundle, the group information thereof is reflected in the group data table 500. When the updating completes, the processing proceeds to step S6103.

In step S6103, the resource service 304 determines whether an application 11n corresponding to the management target application ID 505 recorded in the updated group data table 500 has been installed. An application corresponding to the management target application ID 505 is an application that belongs to the group. This determination is, for example, performed by, referring to a table or the like that registers IDs of installed applications, or querying the application management framework 302. If installed, the processing proceeds to step S6104, and if not installed the processing proceeds to step S6112. In step S6104, the resource service 304 sets the enabled state 506 of the group to which a corresponding application 11n belongs to "enabled". In step S6105, the resource service 304 totals the resource upper-limit value 507 of the groups for which the enabled state 506 is enabled, and determines whether the total value and the resource upper-limit value 412 of the resource definition bundle original data 308 are equal. If not equal the processing proceeds to step S6106, and if equal the processing proceeds to step S6112. In step S6106 the resource service 304 re-records the resource upper-limit value 412 of the resource definition bundle original data 308 to the total amount of the resource upper-limit value 507 of the groups for which the enabled state 506 is enabled. After the change of the resource upper-limit value 412, the processing proceeds to step S6107.

In step S6107 the resource service 304 determines whether the resource definition bundle 307 has been installed. If installed, the processing proceeds to step S6108, and if not installed the processing proceeds to step S6109. In step S6108 the resource service 304 makes a request to the application management framework 302 to uninstall the resource definition bundle 307. Then the application management framework uninstalls the resource definition bundle. When uninstallation completes, the processing proceeds to step S6109.

In step S6109 the resource service 304 requests the application management framework 302 to install the resource definition bundle original data 308. The application management framework 302 refers to the resource upper-limit value 412 of the resource definition bundle original data 308, and determines whether an upper limit value thereof fits in a current available space of a resource in the application execution environment. If it does not fit, then the installation is caused to fail. If it fits, the application management framework 302 uses the resource definition bundle original data 308 to install the resource definition bundle 307. After the resource service 304 requests installation, the processing proceeds to step S6110.

In step S6110 the resource service 304 determines whether the resource definition bundle 307, for which an installation request was made in step S6109, has been installed. If installed, the processing proceeds to step S6112, and if not installed the processing proceeds to step S6111. In step S6111 the resource service 304 outputs a warning to the effect that "the resource upper-limit value of an enabled group does not fit in the current available space of the resource of the application execution environment". The warning may be output as a message to the user interface unit 201. After outputting the warning, the processing proceeds to step S6112. Upon reaching step S6112, the resource service 304 completes the processing for updating the group information 434.

From the above, when an administrator makes a request for the start of the resource service, the application management framework 302 starts the resource service, and the resource service 304 executes processing of the flowchart of FIG. 6B. The resource service 304 first updates the group data table 500, and determines in step S6105 whether there is no inconsistency between the total amount of the resource upper-limit value 507 of groups that are enabled, and the resource upper-limit value 412 of the resource definition bundle original data 308. If an inconsistency is confirmed, the processing proceeds to step S6106. The resource definition bundle original data 308 for which there is no inconsistency with the resource upper-limit value 412, is installed by the application management framework 302, and the processing of the flowchart of FIG. 6B completes.

<Processing when Application is Installed>

FIGS. 6C-1 and 6C-2 show a flowchart that schematically represents a flow of processing of a time of application installation that the resource service 304 performs in step S6008, after the installation completion notification for the application 11n is received. Note that at the time of the installation of the application, the resource upper-limit value 412 recorded in the application resource upper-limit declaration file 402 thereof is allocated for the application. An application belonging to a group is installed after the resource upper-limit value 412 is set to 0 for all resources (or declared as 0 in advance), and an application not belonging to a group is installed with the resource upper-limit value 412 as the declared value.

The processing starts from step S6201. In step S6202, the resource service 304 determines whether the group ID 411 is recorded in the application resource upper-limit declaration file 402 of the installed application 11n. If the group ID 411 is recorded the processing proceeds to step S6203; if not recorded the processing proceeds to step S6217. In step S6217 the processing of FIG. 6C-2 terminates. In step S6203 the resource service 304 determines whether the group ID 411 determined to be have been recorded in step S6202 is stored in the group ID 502 of the group data table 500. If it is stored, the processing proceeds to step S6204; if not stored, the processing proceeds to step S6211. In step S6204 the resource service 304 determines whether the enabled state 506 corresponding to the group ID 502 determined to have been recorded in step S6202 is set to disabled. If it is disabled, the processing proceeds to step S6205, if enabled, the processing proceeds to step S6217 and the processing terminates.

In step S6205 the resource service 304 re-records the resource upper-limit value 412 included in the resource definition bundle original data 308 by adding the resource upper-limit value 507 corresponding to the group ID 502 determined to have been recorded in step S6202 to it. In other words, the resource declaration value of the resource definition bundle is changed using the declaration value of a group-unit resource. If the group is already enabled, because resources of the group are not allocated again, that adding the resource declaration value of the group can be performed so not to duplicate the same group. "So not to duplicate the same group" means, in other words, that when one application belonging to a group is installed previously and thereafter another application belonging to the same group is installed, it is possible to not add to the resource declaration value if the group is enabled. After recording to the resource upper-limit value 412, the processing proceeds to step S6206.

In step S6206 the resource service 304 determines whether the resource definition bundle 307 has been installed. If installed, the processing proceeds to step S6207, and if not installed the processing proceeds to step S6208. In step S6207, the resource service 304 makes a request to the application management framework 302 to uninstall the resource definition bundle 307. The application management framework 302 uninstalls the resource definition bundle 307 that is installed. When uninstallation finishes, the processing proceeds to step S6208. In step S6208, the resource service 304 requests the application management framework 302 to install the resource definition bundle original data 308 (in other words install the resource definition bundle).

The application management framework 302 refers to the resource upper-limit value 412 of the resource definition bundle original data 308, and determines whether that upper limit value fits in a current available space of a resource in the application execution environment. If it does not fit, then the installation is caused to fail. If it fits, the application management framework 302 uses the resource definition bundle original data 308 to install the resource definition bundle 307. By installing the resource definition bundle that adds the resource upper-limit value of the group to the resource upper-limit value, it is possible to reflect, in the management of the application management framework 302, the resource upper-limit value 507 of the group as well.

After the resource service 304 has made a request for the installation of the resource definition bundle 307, the processing proceeds to step S6209. In step S6209, the resource service 304 determines whether the resource definition bundle 307, for which the installation request was made in step S6208, has been installed. If installed, the processing proceeds to step S6210, and if not installed the processing proceeds to step S6214. In step S6210, the resource service 304 sets the enabled state 506 of the group ID 411 determined to be recited in step S6202 to "enabled". After being set to "enabled", the processing proceeds to step S6217.

Regardless of whether the installed application belongs to the group, if the group is not registered in the group data table 500, in step S6211 the resource service 304 outputs a warning that "a fragment bundle that records group information is not installed". After outputting the warning, the processing proceeds to step S6212. In step S6212, the resource service 304 determines whether an application 11n corresponding to the installation completion notification for which reception is determined in step S6007 is still installed. If installed, the processing proceeds to step S6213, and if not installed the processing proceeds to step S6217. In step S6213 the resource service 304 requests the application management framework 302 to uninstall the application 11n determined to be installed in step S6212. The application management framework 302 uninstalls the application 11n instructed in step S6213. After the resource service 304 makes a request for uninstallation, the processing proceeds to step S6217.

If the resource definition bundle was not installed, in step S6214 the resource service 304 outputs a warning that "the resource upper-limit value of the group to which the installed application belongs does not fit in the current available space of the resource of the application execution environment". After outputting the warning, the processing proceeds to step S6215. In step S6215, the resource service 304 re-records the resource upper-limit value of the resource definition bundle original data 308 by subtracting the resource upper-limit value 507 added in step S6205 from it. When the recording finishes the processing proceeds to step S6216. In step S6216, the resource service 304 makes a request to the application management framework 302 for installation of the resource definition bundle original data 308. The application management framework 302 uses the resource definition bundle original data 308 to install the resource definition bundle 307. By re-installing after returning the resource definition bundle original data 308 to the value before adding the resource upper-limit value of the group, the allocated resource becomes the value before the addition of the upper limit value, and is not changed. After the resource service 304 makes a request for installation, the processing proceeds to step S6212.

In step S6212 onward, if an application 11n corresponding to the installation completion notification for which reception was determined in step S6007 is still installed, it is uninstalled. Thereafter, the processing of a time of application installation that the resource service 304 performs in step S6008 completes.

<FIGS. 6C-1 and 6C-2 Summary>

As a result of the processing of FIGS. 6C-1 and 6C-2, if an installed application is an application that belongs to a group and there is a need to newly allocate a resource for the group, the resource service 304, which has received an installation notification, allocates the upper limit value for the resource, which is defined for that group, as a resource of the resource definition bundle 307. If the fragment bundle of the group has not been installed, or if allocation of the resource upper-limit value of the resource definition bundle 307 (in other words the total value of the resource upper-limit value of the groups corresponding to the installed fragment bundles) could not be performed and the installation of the resource definition bundle 307 failed, the application is uninstalled.

<Processing when Application is Uninstalled>

FIG. 6D is a flowchart that schematically represents a flow of processing of a time of application uninstallation that the resource service 304 performs in step S6010, after the uninstallation completion notification for the application 11n is received. The processing starts from step S6301.

In step S6302, the resource service 304 determines whether the application ID 410 of the uninstalled application 11n is stored in the management target application ID 505 of the group data table 500. If it is stored in the table, the processing proceeds to step S6303; if not stored, the processing proceeds to step S6310. In step S6303 the resource service 304 determines whether an application 11n belonging to the same group as the uninstalled application 11n is installed. If not installed, the processing proceeds to step S6304, and if even one is installed the processing proceeds to step S6310.

In step S6304, the resource service 304 re-records the resource definition bundle original data 308 by subtracting the resource upper-limit value 507, corresponding to the group ID 502 to which the management target application ID 505 of the uninstalled application belongs, from the resource upper-limit value 412 included in the resource definition bundle original data 308. Thereafter the processing proceeds to step S6305.

In step S6305, the resource service 304 makes a request to the application management framework 302 to uninstall the resource definition bundle 307. The application management framework 302 uninstalls the resource definition bundle 307 that is installed. When uninstallation finishes, the processing proceeds to step S6306.

In step S6306, the resource service 304 makes a request to the application management framework 302 to install the resource definition bundle original data 308 (in other words install the resource definition bundle). The application management framework 302 uses the resource definition bundle original data 308 to install the resource definition bundle 307. By installing the resource definition bundle for which the resource upper-limit value has been reduced by the resource upper-limit value of the group, it is possible to release a resource of the group to which no installed applications belong. After the resource service 304 has made a request for the installation of the resource definition bundle 307, the processing proceeds to step S6307.

In step S6307, the resource service 304 sets the enabled state 506 of the group to which the uninstalled application 11n belongs to "disabled". After the setting, the processing proceeds to step S6308. In step S6308 the resource service 304 determines whether the enabled state of all groups of the group data table 500 is disabled. If all are disabled, the processing proceeds to step S6309, and if not all are disabled, the processing proceeds to step S6310. In step S6309, the resource service 304 makes a request to the application management framework 302 to uninstall the resource definition bundle 307. Then the application management framework 302 uninstalls the resource definition bundle 307. When the resource service 304 makes a request, the processing proceeds to step S6310. In step S6310, the processing of FIG. 6D terminates.

<FIG. 6D Summary>

By the above, when an administrator requests uninstallation of an application 11n, the application management framework 302 uninstalls the application 11n, and transmits an uninstallation completion notification to the resource service 304. Upon receiving the uninstallation completion notification, if the uninstalled application 11n was managed as a group and no other application that belongs to this group is installed, the resource service 304 re-installs the resource definition bundle 307 after subtracting the resource upper-limit value 507 of the group to which the uninstalled application 11n belongs from the resource upper-limit value 412 of the resource definition bundle original data 308. The enabled state 506 of the group is then set to disabled. If the enabled state 506 of all other groups becomes disabled, group management of the resource ceases to be necessary, and therefore the resource definition bundle is uninstalled.

Thus, in the first embodiment of the present invention, when an application 11n belonging to a group is installed, by adding the resource upper-limit value of the group to the resource upper-limit value 412 of the resource definition bundle 307 and re-installing the resource definition bundle 307, it is possible to declare the resource upper-limit value of the group, and it is possible to allocate a resource corresponding to the upper limit value. Similarly, when an application 11n that belongs to a group is requested to be uninstalled, it is possible to declare by re-installing after subtracting the resource upper-limit value of the group from the resource upper-limit value 412 of the resource definition bundle 307, and it is possible to release a resource corresponding to the resource upper-limit value of the group that has been removed from a management target. With this, it is possible to flexibly change a resource upper-limit value corresponding to an application belong to a group that an administrator installs.

For example, the application 1n belonging to a group performs a resource request with respect to the resource service 304. In response to that, from a resource allocated at a time of installation of the resource definition bundle 307, the resource service 304 returns a resource object to the application 11n, to allocate the resource.

By virtue of the present embodiment, a resource for a management target group is allocated by installation of the resource definition bundle. If the resource definition bundle is a bundle that is exclusive to that objective, it is possible to manage the resource of the group independently of resources consumed by other applications included the resource service.

Even if the resource service is stopped, an application that is installed and is a group management target continues to be a target of resource management in units of the group while the resource definition bundle is operating.

Note that, in the present embodiment, by recording the group information 434 in the fragment bundle resource upper-limit declaration file 422 and installing the fragment bundle, that information is read. However, configuration may be taken to read the group information 434 by setting and transmitting a file in which the group information 434 is recorded by a browser or the like of a PC.

Second Embodiment

Next, for the second embodiment of the present invention, an explanation is added using figures. In the first embodiment, so as to not reflect a resource upper-limit value that is not used, it was necessary to change the resource upper-limit value 412 when installing the application 11n, instead of when installing the fragment bundle 306n. Thus, when installation of the resource definition bundle original data 308 failed, it was necessary to uninstall the installed application 11n. However, by performing, under a user interface of the resource service 304 and from the resource service UI, setting of group information and installation of applications belonging to the group in a flow sequence, it is possible to make such uninstalling unnecessary. In the present embodiment, a resource management apparatus, which performs setting of the group information and installation of an application that belongs to the group, is illustrated.

A view for illustrating a configuration of apparatuses according to the second embodiment of the present invention is similar to that of FIG. 1. The hardware configuration of the image forming apparatus 100 in the present embodiment is similar to that illustrated in FIG. 2. A configuration of an application execution environment for executing an application 11n in the present embodiment is similar to that illustrated in FIG. 3. Content of files that configure the application 11n in the present embodiment and content of files that configure a fragment bundle 306n are similar to that illustrated in FIG. 4A and FIG. 4B.

Figure 7:
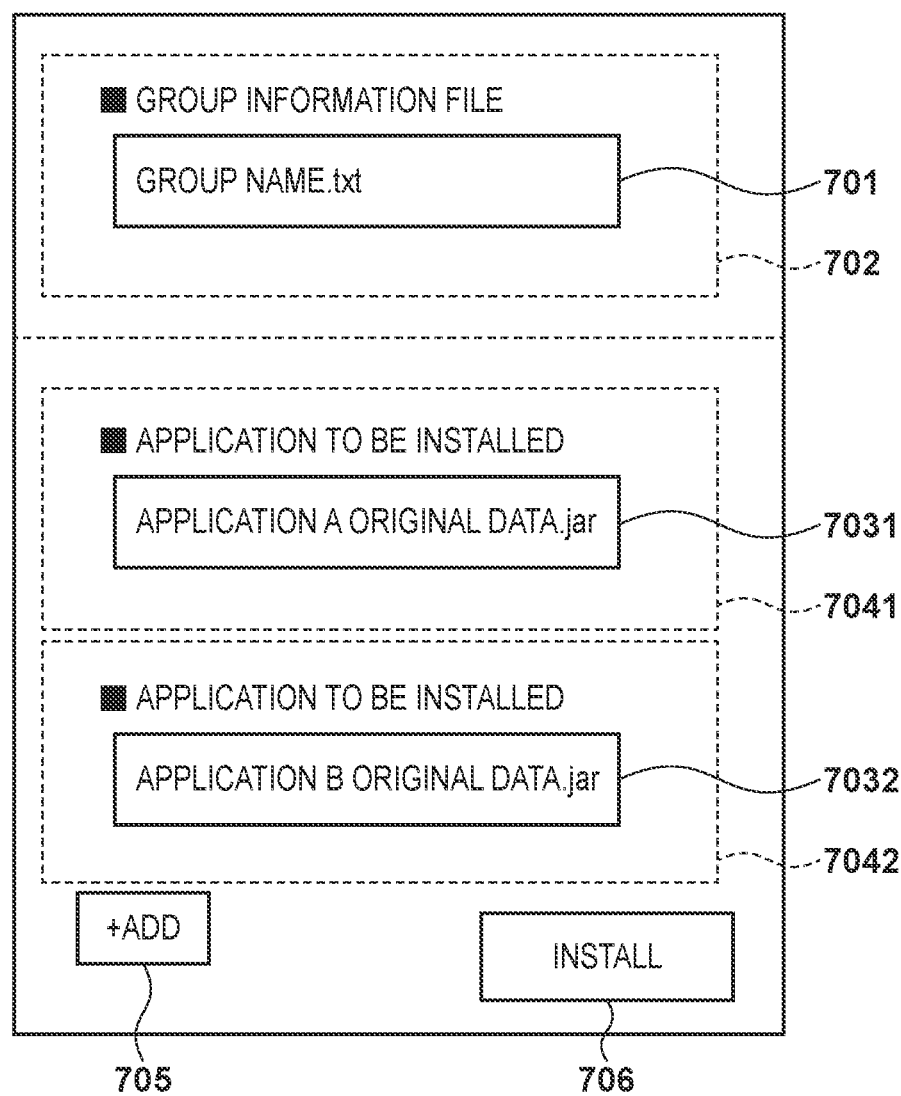
FIG. 7 is the view for illustrating an example of a screen of a resource service UI according to the second embodiment of the present invention.

FIG. 7 illustrates an example of a screen of the resource service UI displayed by the information processing apparatus 101. A user can operate this user interface and install applications. In FIG. 7, a group information file 701 is a file name that describes group information that is set. The group ID 431, the resource upper-limit value 432 and the affiliated application IDs 433 are recorded in the group information file. An item 702 is a group information file designation item that designates the group information file 701. Original application data 7031 and 7032 are original application data names for installing an application that belongs to the group described in the group information file. Items 7041 and 7042 are original application data designation items for designating original application data 703n of the affiliated application IDs 433 described in the group information file. The original application data for example includes content of the application resource upper-limit declaration file of the application. An item addition button 705 is a button for adding an original application data designation item 704n when three or more applications 11n are installed. An install execution button 706 is a button for installing the application 11n based on the description of the group information file 701 that is designated.

When an administrator inputs each of the designation items 702 and 704n, and presses an install execution button, the resource service 304 first refers to the description of the group information file. When it is confirmed that the necessary group information 434 is recorded, the resource upper-limit value 432 recorded in the group information file is added to the resource upper-limit value 412 of the resource definition bundle original data 308. Then, a request is made to the application management framework 302 to install the resource definition bundle 307. If the resource definition bundle 307 is installed, a request is made to the application management framework 302 to install the application 11n designated by the original application data designation item 704n. If the installation of the resource definition bundle fails, installation of the application 11n designated by the original application data designation item 704n is caused to fail. Causing it to fail means, for example, notifying a user via a user interface or the like of the designated application was not installed and the installation failed.

<Application Install Process>

FIGS. 8A and 8B show a flowchart that schematically represents a processing flow that the resource service 304 performs after an administrator has pressed an install execution button. The processing starts from step S8001. In step S8002 the resource service 304 refers to the group information file designated in the group information file designation item 702, and the processing proceeds to step S8003. In step S8003, the resource service 304 determines whether the group information 434 is all recorded in the group information file 701. If it is recorded, the processing proceeds to step S6205; if not recorded, the processing proceeds to step S8009. In step S8009, the resource service 304 outputs a warning to the effect that "the group information file is not correctly recorded". After outputting the warning, the processing proceeds to step S8012. Step S6205-step S6209 and step S6214-step S6216 are the same processing as the corresponding processing in FIGS. 6C-1 and 6C-2, and thus explanation thereof is omitted. In step S6209, if the resource definition bundle was installed, the processing proceeds to step S8004; if it was not installed, the processing proceeds to step S6214.

In step S8004 the resource service 304 stores, in the group data table 500, the group information 434 included in the group information file read in step S8002, and sets the enabled state of the group to enabled. When set the processing proceeds to step S8005. In step S8005 the resource service 304 determines whether the application 11n, for which an install process has not yet been performed is designated in the original application data designation item 704n. If designated, the processing proceeds to step S8006 and the install process is performed, if not designated the processing proceeds to step S8012. In step S8006 the resource service 304 determines whether the original application data 703n designated is an application recorded in the group information file 701. If it is recorded, the processing proceeds to step S8007; if not recorded, the processing proceeds to step S8010. In step S8007, the resource service 304 makes a request to the application management framework 302 for installation of the designated original application data 703n. At this point, for the resource upper-limit value 412 recorded in the original application data 703n, the upper limit value of all resources is 0 for applications belonging to the group.

The application management framework 302 uses the original application data 703n to install the application 11n. When the resource service 304 makes a request, the processing proceeds to step S8008. In step S8008, the resource service 304 determines whether the application 11n for which the installation request was made in step S8007 has been installed. If installed, the processing proceeds to step S8005, and if not installed the processing proceeds to step S8010.

In step S8010 the resource service 304 outputs a warning to the effect that "installation of the application designated by the original application data designation item failed". After outputting the warning, the processing proceeds to step S8005.

After requesting installation of the resource definition bundle in step S6216, the processing proceeds to step S8011. In step S8011 the resource service 304 stops installation of the original application data 703n designated in the original application data designation item 704n, and the processing proceeds to step S8012. Upon reaching step S8012, processing of the flowchart of FIG. 8B completes. Note that, in the step of step S8011, the request to install the application is not yet performed. Thus, nothing is performed in step S8011, or, similarly to in step S8010, a warning to the effect that the designated application could not be installed is output from a user interface or the like.

By the above, after an administrator presses the install execution button, the resource service 304 first reads the inputted group information file 701. If there is a deficiency or a shortage in content recorded in the file, a warning is output, if not then the resource upper-limit value 412 of the resource definition bundle original data 308 is changed, and then installation is performed. If the resource definition bundle 307 cannot be installed, installation of the original application data 703n is stopped. If the resource definition bundle 307 can be installed, the original application data 703n designated by the original application data designation item 704n is installed. If it was possible to install all designated original application data 703n, processing that the resource service 304 performs after the install execution button is pressed completes.

Thus, in the second embodiment of the present invention, it is possible to install the resource definition bundle original data 308 for which the resource upper-limit value 412 has been changed before installing the application 11n. With this, if installation of the resource definition bundle fails, it is possible to stop installation of the application.

Note that, in the present embodiment, the resource service displayed the resource service UI on the information processing apparatus 101, but it may be displayed on the user interface unit 201. In addition, configuration may be taken such that a group information file is prepared in advance in a predetermined storage region for each group, and when a user selects original application data to install, the resource service 304, based on the group ID recorded therein, selects a corresponding group information file from the prepared group information files. Furthermore, configuration may be taken such that what a user selects is a name or an ID of an application to install, original application data corresponding to the name or ID is searched for, and additionally a group information file corresponding to the group ID included in the original data is searched for. Of course at a time of installation a file that was found is used. In addition, if a corresponding group information file is not found, because it does not belong to a group, the installation may be performed by the application management framework 302 without concern for the resource service 304.

In addition, even in a case of executing installation of applications by the procedure of FIGS. 8A and 8B, the resource service 304 can execute the processing of FIG. 6A. If an application is installed in FIGS. 8A and 8B, because "NO" is determined in step S6204 of FIG. 6C-1, there is no duplicated installation because the resource definition bundle 307 is one application.

In addition, the user interface of FIG. 7 can also be applied to the first embodiment. In the first embodiment, configuration may be taken to, as in FIG. 7, allow a group and applications to be instructed in one screen, or allowing an instruction of either one, and accepting an instruction for installation thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-022346, filed Feb. 6, 2015, which is hereby incorporated by reference herein in its entirety.

What is claimed is:

1. A resource management apparatus for managing a resource of an application in a unit of a group, wherein the resource management apparatus includes at least one processor and at least one memory coupled to the at least one processor and having stored thereon instructions which, when executed by the at least one processor, cause the at least one processor to function as:

a changing unit configured to, when an application belonging to a group is installed on a system that, due to an installation of an application, allocates for the application a resource in accordance with a declaration value of the application, add a declaration value of a resource of the group to which the installed application belongs to a declaration value of a resource of a resource definition application; and an install unit configured to install, after addition processing by the changing unit, the resource definition application in the system, wherein the changing unit, if instructed to install an application that belongs to the group, before installing the application adds a declaration value of the resource of a group to which the application belongs to change the declaration value of the resource of the resource definition application so not to duplicate, and the install unit installs the resource definition application, and in a case where the installation of the resource definition application fails, stops the installation of the application.

2. The resource management apparatus according to claim 1, wherein a declaration value of a resource that the application belonging to the group declares is 0.

3. The resource management apparatus according to claim 1, wherein, when all applications belonging to a group are uninstalled from the system, the changing unit subtracts the declaration value of the resource of the group from the declaration value of the resource of the resource definition application, and the install unit re-installs the resource definition application.

4. The resource management apparatus according to claim 1, further comprising a table that holds group information associating a group, an application that belongs to the group, and a declaration value of a resource of the group, wherein when an application is installed, the changing unit obtains from the table and adds a declaration value of a resource of a group corresponding to the application to change the declaration value of the resource of the resource definition application, and the install unit installs the resource definition application.

5. The resource management apparatus according to claim 4, wherein the at least one processor and at least one memory cooperate to act as an addition unit configured to add group information that includes a group of a new application, an application belonging to the group, and a declaration value of a resource of the group to the table.

6. The resource management apparatus according to claim 5, wherein the addition unit, when a fragment application that holds the group information is installed in the system, obtains the group information from the fragment application and adds the group information to the table.

7. The resource management apparatus according to claim 1, wherein the install unit, in a case where the resource definition application is already installed, uninstalls and then installs again the resource definition application.

8. The resource management apparatus according to claim 1, wherein the changing unit, after an application belonging to the group is installed in the system, adds a declaration value of a resource of the group to change the declaration value of the resource of the resource definition application so not to duplicate, and performs installation of the resource definition application by the install unit, and in a case where the installation of the resource definition application fails, outputs that a failure occurred, and uninstalls the application.

9. The resource management apparatus according to claim 1, wherein the at least one processor and at least one memory cooperate to act as a user interface unit configured to provide a user interface, wherein by the user interface unit, installation of at least one of the group, and an application that belongs to the group is instructed.

10. The resource management apparatus according to claim 1, wherein the at least one processor and at least one memory cooperate to act as a unit configured to allocate, in accordance with a request for a resource from an application that belongs to the group, a resource to the application from a resource allocated for the resource definition application.

11. A non-transitory computer-readable medium storing a program for causing, when loaded and executed in a computer, the computer to execute a process, the process comprising:

when an application belonging to a group is installed on a system that, due to an installation of an application, allocates for the application a resource in accordance with a declaration value of the application, adding a declaration value of a resource of the group to which the installed application belongs to a declaration value of a resource of a resource definition application; and installing, after the adding, the resource definition application in the system, wherein if instructed to install an application that belongs to the group, before installing the application, a declaration value of the resource of a group to which the application belongs is added to change the declaration value of the resource of the resource definition application so not to duplicate, and the resource definition application is installed, and in a case where the installation of the resource definition application fails, the installation of the application is stopped.

12. A resource management method, executed by a computer, for managing a resource of an application in a unit of a group, comprising:

when an application belonging to a group is installed on a system that, due to an installation of an application, allocates for the application a resource in accordance with a declaration value of the application, adding a declaration value of a resource of the group to which the installed application belongs to a declaration value of a resource of a resource definition application; and installing, after the adding of the declaration value, the resource definition application in the system, wherein if instructed to install an application that belongs to the group, before installing the application, a declaration value of the resource of a group to which the application belongs is added to change the declaration value of the resource of the resource definition application so not to duplicate, and the resource definition application is installed, and in a case where the installation of the resource definition application fails, the installation of the application is stopped.

* * * * *